United States Patent
Cooley et al.

(10) Patent No.: US 11,561,522 B2
(45) Date of Patent: *Jan. 24, 2023

(54) DATA MAPPING BASED ON DEVICE PROFILES

(71) Applicant: Mapped Inc., El Segundo, CA (US)

(72) Inventors: Shaun Cooley, El Segundo, CA (US); Jose De Castro, San Francisco, CA (US); Jason Koh, San Diego, CA (US)

(73) Assignee: Mapped Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/372,256

(22) Filed: Jul. 9, 2021

(65) Prior Publication Data
US 2022/0147009 A1    May 12, 2022

Related U.S. Application Data

(60) Provisional application No. 63/112,268, filed on Nov. 11, 2020.

(51) Int. Cl.
*G05B 19/05* (2006.01)
*G06K 9/62* (2022.01)
(Continued)

(52) U.S. Cl.
CPC ........... *G05B 19/054* (2013.01); *G05B 19/05* (2013.01); *G06F 9/54* (2013.01); *G06F 16/212* (2019.01);
(Continued)

(58) Field of Classification Search
CPC ..................................................... G06N 20/00
(Continued)

(56) References Cited

U.S. PATENT DOCUMENTS

| 5,663,891 A | 9/1997 | Bamji et al. |
| 5,729,466 A | 3/1998 | Bamji |
| | (Continued) | |

FOREIGN PATENT DOCUMENTS

| WO | WO-9913418 A1 | 3/1999 |
| WO | WO-2020089259 A1 | 5/2020 |
| | (Continued) | |

OTHER PUBLICATIONS

Cheong. Four ways to quantify synchrony between time series data. Towards Data Science Available athttps://towardsdatascience.com/four-ways-to-quantify-synchrony-between-time-series-data-b99136c4a9c9 (May 13, 2019).

(Continued)

*Primary Examiner* — Md Azad
(74) *Attorney, Agent, or Firm* — Wilson Sonsini Goodrich & Rosati

(57) ABSTRACT

Described are platforms, systems, and methods for mapping data found in connected equipment from a manufacturer's selected schema, format, and protocol to a normalized data model. The platforms, systems, and methods identify a plurality of data sources associated with an automation environment; retrieve data from at least one of the identified data sources; generate a plurality of data source mapping profiles, each data source mapping profile specific to a particular data source configuration; maintain a data store comprising the plurality of data source mapping profiles; select a data source mapping profile specific to the at least one identified data source configuration; and apply an algorithm to map the retrieved data to a predetermined ontology based on the selected data source mapping profile for the at least one identified data source.

28 Claims, 5 Drawing Sheets

(51) Int. Cl.
*G06N 20/00* (2019.01)
*G06F 16/25* (2019.01)
*G06F 16/21* (2019.01)
*H04L 41/12* (2022.01)
*G06F 16/901* (2019.01)
*G06F 9/54* (2006.01)

(52) U.S. Cl.
CPC ........ *G06F 16/254* (2019.01); *G06F 16/9024* (2019.01); *G06K 9/6263* (2013.01); *G06K 9/6278* (2013.01); *G06N 20/00* (2019.01); *H04L 41/12* (2013.01); *G05B 2219/1215* (2013.01); *G05B 2219/13129* (2013.01); *G05B 2219/15012* (2013.01); *G05B 2219/163* (2013.01)

(58) Field of Classification Search
USPC .......................................................... 700/47
See application file for complete search history.

(56) References Cited

U.S. PATENT DOCUMENTS

| | | | |
|---|---|---|---|
| 7,606,890 | B1 | 10/2009 | Baier et al. |
| 8,773,437 | B1 | 7/2014 | Goldman et al. |
| 8,819,206 | B2 | 8/2014 | Bandi et al. |
| 9,667,641 | B2 | 5/2017 | Muddu et al. |
| 10,019,536 | B2 | 7/2018 | Hong et al. |
| 10,044,630 | B2 | 8/2018 | Kriegesmann et al. |
| 10,216,706 | B1 | 2/2019 | Bonk et al. |
| 10,353,596 | B2* | 7/2019 | Zhou ........................ G06F 3/061 |
| 10,540,383 | B2* | 1/2020 | Cobbett ................ G06F 16/355 |
| 10,901,373 | B2 | 1/2021 | Locke et al. |
| 10,997,195 | B1 | 5/2021 | Sekar |
| 11,455,287 | B1 | 9/2022 | Hillion et al. |
| 2004/0049699 | A1 | 3/2004 | Griffith et al. |
| 2004/0210654 | A1 | 10/2004 | Hrastar |
| 2004/0260518 | A1 | 12/2004 | Polz et al. |
| 2007/0208440 | A1 | 9/2007 | Bliss et al. |
| 2009/0100407 | A1 | 4/2009 | Bouillet et al. |
| 2010/0014432 | A1 | 1/2010 | Durfee et al. |
| 2010/0257535 | A1 | 10/2010 | Badovinatz et al. |
| 2011/0004631 | A1 | 1/2011 | Inokuchi et al. |
| 2011/0087522 | A1 | 4/2011 | Beaty et al. |
| 2011/0179027 | A1 | 7/2011 | Das et al. |
| 2011/0295903 | A1 | 12/2011 | Chen |
| 2012/0084422 | A1 | 4/2012 | Bandi et al. |
| 2012/0158933 | A1 | 6/2012 | Shetty et al. |
| 2013/0124465 | A1* | 5/2013 | Pingel ................... G06F 3/0604 707/610 |
| 2013/0232123 | A1 | 9/2013 | Ahmed et al. |
| 2014/0122806 | A1 | 5/2014 | Lin et al. |
| 2014/0277604 | A1 | 9/2014 | Nixon et al. |
| 2015/0074078 | A1 | 3/2015 | Roche et al. |
| 2015/0074117 | A1 | 3/2015 | Gorelik et al. |
| 2015/0095770 | A1 | 4/2015 | Mani et al. |
| 2015/0180891 | A1 | 6/2015 | Seward et al. |
| 2015/0256635 | A1 | 9/2015 | Casey et al. |
| 2015/0281105 | A1 | 10/2015 | Vaderna et al. |
| 2016/0019228 | A1 | 1/2016 | Hong et al. |
| 2016/0098037 | A1 | 4/2016 | Zornio et al. |
| 2016/0132538 | A1 | 5/2016 | Bliss et al. |
| 2016/0342707 | A1 | 11/2016 | Drobek et al. |
| 2016/0373481 | A1 | 12/2016 | Sultan et al. |
| 2017/0085438 | A1 | 3/2017 | Link et al. |
| 2017/0154080 | A1 | 5/2017 | De et al. |
| 2017/0168779 | A1 | 6/2017 | Sevenich et al. |
| 2017/0249434 | A1 | 8/2017 | Brunner |
| 2017/0286456 | A1* | 10/2017 | Wenzel ................. G06F 16/212 |
| 2018/0173795 | A1 | 6/2018 | Cobbett et al. |
| 2018/0219888 | A1 | 8/2018 | Apostolopoulos |
| 2018/0219919 | A1 | 8/2018 | Crabtree et al. |
| 2018/0232459 | A1 | 8/2018 | Park et al. |
| 2019/0057064 | A1 | 2/2019 | Bonk et al. |
| 2019/0108197 | A1 | 4/2019 | Bonk et al. |
| 2019/0132145 | A1* | 5/2019 | O'Hora ................... F24F 11/46 |
| 2019/0133026 | A1 | 5/2019 | Seaman et al. |
| 2019/0158353 | A1 | 5/2019 | Johnson et al. |
| 2019/0187643 | A1* | 6/2019 | Carpenter ............ G05B 19/042 |
| 2019/0205148 | A1 | 7/2019 | Schur et al. |
| 2019/0220583 | A1 | 7/2019 | Douglas et al. |
| 2019/0324831 | A1 | 10/2019 | Gu |
| 2019/0384238 | A1* | 12/2019 | Songkakul ............... F24F 11/63 |
| 2020/0004751 | A1 | 1/2020 | Stennett et al. |
| 2020/0280565 | A1 | 9/2020 | Rogynskyy et al. |
| 2020/0296137 | A1 | 9/2020 | Crabtree et al. |
| 2020/0327444 | A1 | 10/2020 | Negi et al. |
| 2020/0379992 | A1 | 12/2020 | De Smet |
| 2021/0073216 | A1 | 3/2021 | Chang et al. |
| 2021/0090694 | A1 | 3/2021 | Colley et al. |
| 2021/0133670 | A1* | 5/2021 | Cella ...................... G06N 5/022 |
| 2021/0157312 | A1* | 5/2021 | Cella ...................... G06N 20/00 |
| 2021/0157671 | A1 | 5/2021 | Shastri et al. |
| 2021/0273965 | A1 | 9/2021 | Pi et al. |
| 2021/0287459 | A1 | 9/2021 | Cella et al. |
| 2021/0293103 | A1 | 9/2021 | Olsen et al. |
| 2021/0333762 | A1 | 10/2021 | Govindaraj et al. |
| 2022/0156433 | A1 | 5/2022 | Laane et al. |

FOREIGN PATENT DOCUMENTS

| | | |
|---|---|---|
| WO | WO-2022059588 A1 | 3/2022 |
| WO | WO-2022103812 A1 | 5/2022 |
| WO | WO-2022103813 A1 | 5/2022 |
| WO | WO-2022103820 A1 | 5/2022 |
| WO | WO-2022103822 A1 | 5/2022 |
| WO | WO-2022103824 A1 | 5/2022 |
| WO | WO-2022103829 A1 | 5/2022 |
| WO | WO-2022103831 A1 | 5/2022 |

OTHER PUBLICATIONS

Co-pending U.S. Appl. No. 17/372,238, inventors Cooley; Shaun et al., filed Jul. 9, 2021.
Co-pending U.S. Appl. No. 17/372,242, inventors Cooley; Shaun et al., filed Jul. 9, 2021.
Co-pending U.S. Appl. No. 17/372,247, inventors Cooley; Shaun et al., filed Jul. 9, 2021.
Co-pending U.S. Appl. No. 17/372,251, inventors Cooley; Shaun et al., filed Jul. 9, 2021.
Co-pending U.S. Appl. No. 17/372,267, inventors Cooley; Shaun et al., filed Jul. 9, 2021.
Co-pending U.S. Appl. No. 17/372,275, inventors Cooley; Shaun et al., filed Jul. 9, 2021.
Grady et al. Robust classification of salient links in complex networks. Nat Commun 3:864 (May 29, 2012).
PCT/US2021/058749 International Search Report and Written Opinion dated Dec. 22, 2021.
PCT/US2021/058756 International Search Report and Written Opinion dated Jan. 11, 2022.
PCT/US2021/058759 International Search Report and Written Opinion dated Dec. 22, 2021.
PCT/US2021/058762 International Search Report and Written Opinion dated Dec. 23, 2021.
PCT/US2021/058768 International Search Report and Written Opinion dated Jan. 24, 2022.
PCT/US2021/058771 International Search Report and Written Opinion dated Jan. 11, 2022.
U.S. Appl. No. 17/372,238 Non-Final Office Action dated Jan. 19, 2022.
U.S. Appl. No. 17/372,247 Non-Final Office Action dated Dec. 13, 2021.
U.S. Appl. No. 17/372,251 Office Action dated Nov. 5, 2021.
U.S. Appl. No. 17/372,267 Office Action dated Oct. 26, 2021.
U.S. Appl. No. 17/372,242 Office Action dated Nov. 15, 2021.
U.S. Appl. No. 17/372,275 Office Action dated Nov. 10, 2021.
George et al. Big data and management. Academy of management Journal 57(2):321-326 (2014). Retrieved on Jan. 8, 2022 from https://journals.aom.org/doi/abs/10.5465/amj.2014.4002?journalCode=amj.

(56) References Cited

OTHER PUBLICATIONS

Kind et al.: Relationship Discovery with NetFlow to Enable Business-Driven IT Management. IEEE Xplore, Conference: Business-Driven IT Management, 2006, pp. 63-70 DOI:10.1109/BDIM.2006.1649212 (2006).
PCT/US2021/058748 International Search Report and Written Opinion dated Feb. 9, 2022.
U.S. Appl. No. 17/372,238 Final Office Action dated Apr. 19, 2022.
U.S. Appl. No. 17/372,242 Final Office Action dated Mar. 4, 2022.
U.S. Appl. No. 17/372,247 Final Office Action dated Apr. 26, 2022.
U.S. Appl. No. 17/372,251 Final Office Action dated Feb. 22, 2022.
U.S. Appl. No. 17/372,267 Final Office Action dated Feb. 9, 2022.
U.S. Appl. No. 17/372,267 Non-Final Office Action dated Jul. 21, 2022.
U.S. Appl. No. 17/372,275 Final Office Action dated Mar. 4, 2022.
U.S. Appl. No. 17/372,267 Final Office Action dated Oct. 24, 2022.
U.S. Appl. No. 17/372,247 Non-Final Office Action dated Nov. 14, 2022.

* cited by examiner

DATA MAPPING BASED ON DEVICE PROFILES

CROSS-REFERENCE TO RELATED APPLICATIONS

This application is related to applications U.S. application Ser. No. 17/372,238, U.S. application Ser. No. 17/372,242, U.S. application Ser. No. 17/372,247, U.S. application Ser. No. 17/372,251, U.S. application Ser. No. 17/372,267, and U.S. application Ser. No. 17/372,275, all filed on the same date, Jul. 9, 2021, the same date on which the present application was filed. This application claims the priority and benefit of U.S. Provisional Application No. 63/112,268, filed Nov. 11, 2020, and entitled: DATA INTEGRATION AND ENRICHMENT PLATFORM FOR AUTOMATED INDUSTRIAL AND COMMERCIAL ENVIRONMENTS. All of these applications are incorporated herein by reference in their entireties.

BACKGROUND

Automation is the use of control systems to operate processes without human intervention. These systems generally include software, computers, beacons, sensors, actuators, and in some cases robotics. In industrial and commercial settings, benefits of automation include increases in productivity, accuracy, flexibility, and safety, while providing overall cost savings. A "smart building" uses a combination of technologies to automate building management. The terms "smart office" and "smart home" are used to describe a structure that uses technology to allow systems and electronics to communicate with one another, be controlled by a time schedule, and even be remotely activated from a smartphone or other web-enabled device. A few of the systems that can be controlled include lighting, heating, ventilation, air conditioning, vertical lifts, fire safety systems, appliances, and security systems. As such, smart buildings can provide comfort and convenience while enhancing security and energy efficiency. Cities of the future are anticipated to offer a wide array of "smart technologies," e.g., networked technology that controls aspects of transportation, energy, air, and water quality.

SUMMARY

Automated industrial and commercial environments largely consist of commodity components, for example, Internet of Things (IoT) devices, and these IoT devices may be assembled in a bespoke manner. Across the various verticals, such as manufacturing, commercial buildings, energy production, transportation, oil & gas, and cities, there may exist tens of thousands of different models of equipment manufactured by thousands of vendors that speak one of a few hundred different protocols. Because of the difference between protocols among IoT devices, the automated environment may suffer from platform fragmentation, lack of interoperability, and common technical standards. To further exacerbate the issue, each of these pieces of equipment (IoT devices) uses their chosen protocol that may be just a little different from the protocol's specification and sometimes drastically different from other functionally identical pieces of equipment from different manufacturers. These differences are often buried deep in a several hundred-page document from the device's manufacturer or only discovered at runtime. This extreme heterogeneity has resulted in a requirement for humans to be involved in the provisioning, deployment, and maintenance of these otherwise automated systems.

As these environments are now connected to networks (e.g., IP-based networks) for monitoring and control, through what is typically called the Internet of Things, humans must now manually map all of the individual equipment data models and protocol intricacies to a common data model so that analytics and dashboards can be accurate so as to provide the data owner with actionable insight. This is typically done in a visual application that allows an engineer to drag each individual field from source model to destination model or through custom written conversion/translation code. Both of these models can take a few hours per device as the human reads manufacturer documentation, maps the fields, and validates their mappings. With tens of thousands of pieces of equipment to map per commercial or industrial environment, this mapping process can take several weeks to several months to complete. This time and labor consuming process has slowed down the adoption of IoT devices and lowered the productivities of existing automated environment.

Described herein are platforms, systems, and methods that automatically discover, extract, map, merge, and enrich data found in systems on-premises in automated industrial and commercial environments and cloud systems for purposes of providing developers access to normalized, merged, and enriched data through an API.

The subject matter described herein includes platforms, systems, and methods that provide mechanisms to automatically generate device profile for each of the IoT devices in an antumated environment, and further map the data from each of the IoT devices into a well-defined ontology to provide normalized data. The following components, in various embodiments, are needed to implement the platforms, systems, and methods described herein:

Data or data source (device) discovery mechanism;
  Data extraction system;
  Data mapping mechanism;
  Target schema or ontology;
  Data storage system; and
  Device mapping profile creation mechanism.

Accordingly, in one aspect, disclosed herein are computer-implemented methods comprising: identifying a plurality of data sources associated with an automation environment, wherein each data source comprises a respective data source configuration; retrieving data from at least one of the identified data sources; generating a plurality of data source mapping profiles, each data source mapping profile specific to a particular data source configuration; maintaining a first data store comprising the plurality of data source mapping profiles; selecting a data source mapping profile specific to the respective data source configuration associated with each of the at least one identified data source; and applying a first algorithm to map the retrieved data to a predetermined ontology based on the selected data source mapping profile for the at least one identified data source. In some embodiments, the automation environment comprises at least one networked industrial or commercial automation system. In various embodiments, the plurality of data sources comprises at least one device, at least one programmable logic controller (PLC), at least one automation controller, at least one data file, at least one cloud service, or a combination thereof. In some embodiments, the plurality of data sources comprises at least one device utilizing a first communications protocol and at least one device utilizing a second communications protocol, wherein the first communications protocol is different from the second communications protocol. In various embodiments, the identifying the plurality of data sources is performed by passive discovery, active discovery, target interrogation, or a combination thereof. In further embodiments, the passive discovery comprises observing traffic on a network. In still further embodiments, the passive discovery comprises identifying an origin or a destination for the traffic on the network. In further embodiments, the active discovery comprises IP subnet scanning on a network, port scanning on a network, issuing protocol specific discovery commands on a network, or a combination thereof. In further embodiments, the target interrogation comprises introspecting at least one PLC on a network. In various embodiments, the retrieving data is performed on a schedule, performed in response to an event, as a result of passively observing communications among the data sources, or a combination thereof. In some embodiments, the retrieved data comprises a unique address for the data source. In some embodiments, the retrieved data comprises one or more of: a make, model, and firmware version for the data source. In some embodiments, the retrieved data comprises a unique fingerprint identifying the data source. In some embodiments, generating a data source mapping profile specific to a particular data source configuration comprises: identifying manufacturer documentation for the particular data source configuration; and utilizing an automated document processing (ADP) or automated form recognition (AFR) process to process details of the documentation. In further embodiments, the method further comprises applying a machine learning model to the output of the ADP or AFR process to generate the data source mapping profile. In various further embodiments, the machine learning model comprises one or more of the following: one or more neural networks, one or more deep neural networks, one or more support vector machines (SVM), one or more Bayesian models, linear regression, logistic regression, or k-means clustering. In some embodiments, generating a data source mapping profile specific to a particular data source configuration comprises: identifying manufacturer documentation for the particular data source configuration; and applying a machine learning model to process details of the documentation. In various further embodiments, the machine learning model comprises one or more of the following: one or more neural networks, one or more deep neural networks, one or more support vector machines (SVM), one or more Bayesian models, linear regression, logistic regression, or k-means clustering. In still further embodiments, the method further comprises conducting human validation of the output of the machine learning model and utilizing the output of the human validation to improve the machine learning model. In some embodiments, the predetermined ontology describes all of the equipment functions, properties, and data for the data sources associated with the automation environment. In some embodiments, the data source mapping profile specific to the respective data source configuration associated with each of the at least one identified data source is selected based at least in part on the retrieved data. In various embodiments, the first algorithm comprises, a logic schema, a set of rules, a machine learning model, a statistical model, or a combination thereof. In some embodiments, the first algorithm executes instructions in a domain specific language (DSL) that provide mapping instructions. In some embodiments, the first algorithm executes instructions in a general purpose language that provide mapping instructions. In some embodiments, the method further comprises: maintaining a second data store; and merging the mapped data into the second data store. In further embodiments, the second data store comprises a graph database, wherein each vertex in the graph includes a timeseries store to capture data changes over time. In still further embodiments, the merging the mapped data into the second data store comprises matching mapped data with evolved vertices in the graph and merging any new properties, shape details, or relationships into the matched vertices and any timeseries data recorded in the vertex's timeseries store. In still further embodiments, the vertices, edges, properties, and underlying data is substantially continuously updated to reflect the state of the data sources associated with the automation environment. In some embodiments, the steps are performed by a computer-based platform automatically and substantially continuously.

In another aspect, disclosed herein are systems and platforms comprising at least one computing device comprising at least one processor, a memory, and instructions executable by the at least one processor to create an application comprising: a software module identifying a plurality of data sources associated with an automation environment, wherein each data source comprises a respective data source configuration; a software module retrieving data from at least one of the identified data sources; a software module generating a plurality of data source mapping profiles, each data source mapping profile specific to a particular data source configuration; a first data store comprising the plurality of data source mapping profiles; a software module selecting a data source mapping profile specific to the respective data source configuration associated with each of the at least one identified data source; and a software module applying a first algorithm to map the retrieved data to a predetermined ontology based on the selected data source mapping profile for the at least one identified data source. In some embodiments, the automation environment comprises at least one networked industrial or commercial automation system. In various embodiments, the plurality of data sources comprises at least one device, at least one programmable logic controller (PLC), at least one automation controller, at least one data file, at least one cloud service, or a combination thereof. In some embodiments, the plurality of data sources comprises at least one device utilizing a first communications protocol and at least one device utilizing a second communications protocol, wherein the first communications protocol is different from the second communications protocol. In various embodiments, the software module identifying the plurality of data sources utilizes passive discovery, active discovery, target interrogation, or a combination thereof. In further embodiments, the passive discovery comprises observing traffic on a network. In still further embodiments, the passive discovery comprises identifying an origin or a destination for the traffic on the network. In further embodiments, the active discovery comprises IP subnet scanning on a network, port scanning on a network, issuing protocol specific discovery commands on a network, or a combination thereof. In further embodiments, the target interrogation comprises introspecting at least one PLC on a network. In various embodiments, the software module retrieving data retrieves the data on a schedule, in response to an event, as a result of passively observing communications among the data sources, or a combination thereof. In some embodiments, the retrieved data comprises a unique address for the data source. In some embodiments, the retrieved data comprises one or more of: a make, model, and firmware version for the data source. In some embodiments, the retrieved data comprises a unique fingerprint identifying the data source. In some embodiments, the software module generating a plurality of data source mapping profiles performs operations comprising: identifying manufacturer documentation for the particular data source configuration; and utilizing an automated document processing (ADP) or automated form recognition (AFR) process to process details of the documentation. In further embodiments, the software module generating a plurality of data source mapping profiles performs operations further comprising applying a machine learning model to the output of the ADP or AFR process to generate the data source mapping profile. In various further embodiments, the machine learning model comprises one or more of the following: one or more neural networks, one or more deep neural networks, one or more support vector machines (SVM), one or more Bayesian models, linear regression, logistic regression, or k-means clustering. In some embodiments, the software module generating a plurality of data source mapping profiles performs operations comprising: identifying manufacturer documentation for the particular data source configuration; and applying a machine learning model to process details of the documentation. In various further embodiments, the machine learning model comprises one or more of the following: one or more neural networks, one or more deep neural networks, one or more support vector machines (SVM), one or more Bayesian models, linear regression, logistic regression, or k-means clustering. In still further embodiments, the output of the machine learning model is validated by a human process and the output of the human validation is provided as feedback to improve the machine learning model. In some embodiments, the predetermined ontology comprises descriptions of all the equipment functions, properties, and data for the data sources associated with the automation environment. In some embodiments, the software module selecting a data source mapping profile makes the selection based at least in part on the retrieved data. In various embodiments, the first algorithm comprises, a logic schema, a set of rules, a machine learning model, a statistical model, or a combination thereof. In some embodiments, the first algorithm executes instructions in a domain specific language (DSL) that provide mapping instructions. In some embodiments, the first algorithm executes instructions in a general purpose language that provide mapping instructions. In some embodiments, the application further comprises a software module merging the mapped data into a second data store. In further embodiments, the second data store comprises a graph database, wherein each vertex in the graph includes a timeseries store to capture data changes over time. In still further embodiments, the software module merging the mapped data into a second data store matches mapped data with evolved vertices in the graph and merges any new properties, shape details, or relationships into the matched vertices and any timeseries data recorded in the vertex's timeseries store. In still further embodiments, the vertices, edges, properties, and underlying data is substantially continuously updated to reflect the state of the data sources associated with the automation environment. In some embodiments, the software modules perform their configured functions automatically and substantially continuously.

In another aspect, disclosed herein are non-transitory computer-readable storage media encoded with instructions executable by one or more processors to provide an application comprising: a data source discovery module identifying a plurality of data sources associated with an automation environment, wherein each data source comprises a respective data source configuration; a data extraction module retrieving data from at least one of the identified data sources; a data source profiling module generating a plurality of data source mapping profiles, each data source mapping profile specific to a particular data source configuration; a first data store comprising the plurality of data source mapping profiles; a data source identification module selecting a data source mapping profile specific to the respective data source configuration associated with each of the at least one identified data source; and a data mapping module applying a first algorithm to map the retrieved data to a predetermined ontology based on the selected data source mapping profile for the at least one identified data source. In some embodiments, the automation environment comprises at least one networked industrial or commercial automation system. In various embodiments, the plurality of data sources comprises at least one device, at least one programmable logic controller (PLC), at least one automation controller, at least one data file, at least one cloud service, or a combination thereof. In some embodiments, the plurality of data sources comprises at least one device utilizing a first communications protocol and at least one device utilizing a second communications protocol, wherein the first communications protocol is different from the second communications protocol. In various embodiments, the data source discovery module identifies the plurality of data sources by passive discovery, active discovery, target interrogation, or a combination thereof. In further embodiments, the passive discovery comprises observing traffic on a network. In still further embodiments, the passive discovery comprises identifying an origin or a destination for the traffic on the network. In further embodiments, the active discovery comprises IP subnet scanning on a network, port scanning on a network, issuing protocol specific discovery commands on a network, or a combination thereof. In further embodiments, the target interrogation comprises introspecting at least one PLC on a network. In various embodiments, the data extraction module retrieves the data on a schedule, in response to an event, as a result of passively observing communications among the data sources, or a combination thereof. In some embodiments, the retrieved data comprises a unique address for the data source. In some embodiments, the retrieved data comprises one or more of: a make, model, and firmware version for the data source. In some embodiments, the retrieved data comprises a unique fingerprint identifying the data source. In some embodiments, the data source profiling module performs operations comprising: identifying manufacturer documentation for the particular data source configuration; and utilizing an automated document processing (ADP) or automated form recognition (AFR) process to process details of the documentation. In further embodiments, the data source profiling module performs operations further comprising applying a machine learning model to the output of the ADP or AFR process to generate the data source mapping profile. In various further embodiments, the machine learning model comprises one or more of the following: one or more neural networks, one or more deep neural networks, one or more support vector machines (SVM), one or more Bayesian models, linear regression, logistic regression, or k-means clustering. In some embodiments, the data source profiling module performs operations comprising: identifying manufacturer documentation for the particular data source configuration; and applying a machine learning model to process details of the documentation. In various further embodiments, the machine learning model comprises one or more of the following: one or more neural networks, one or more deep neural networks, one or more support vector machines (SVM), one or more Bayesian models, linear regression, logistic regression, or k-means clustering. In still further embodiments, the output of the machine learning model is validated by a human process and the output of the human validation is provided as feedback to improve the machine learning model. In some embodiments, the predetermined ontology comprises descriptions of all the equipment functions, properties, and data for the data sources associated with the automation environment. In some embodiments, the data source identification module selects a data source mapping profile specific to the respective data source configuration associated with the at least one identified data source based at least in part on the retrieved data. In various embodiments, the first algorithm comprises, a logic schema, a set of rules, a machine learning model, a statistical model, or a combination thereof. In some embodiments, the first algorithm executes instructions in a domain specific language (DSL) that provide mapping instructions. In some embodiments, the first algorithm executes instructions in a general purpose language that provide mapping instructions. In some embodiments, the application further comprises a data merging module merging the mapped data into a second data store. In further embodiments, the second data store comprises a graph database, wherein each vertex in the graph includes a timeseries store to capture data changes over time. In still further embodiments, the data merging module matches mapped data with evolved vertices in the graph and merges any new properties, shape details, or relationships into the matched vertices and any timeseries data recorded in the vertex's timeseries store. In still further embodiments, the vertices, edges, properties, and underlying data is substantially continuously updated to reflect the state of the data sources associated with the automation environment. In some embodiments, the modules are configured to perform their functions automatically and substantially continuously.

In another aspect, disclosed herein are computer-implemented methods comprising: identifying a data source associated with an automation environment and having a data source configuration; retrieving data from identified data source; generating a data source mapping profile specific to the data source configuration by performing operations comprising: identifying manufacturer documentation for the particular data source configuration; and utilizing an automated document processing (ADP) or automated form recognition (AFR) process to process details of the documentation; and applying an algorithm to map the retrieved data to a predetermined ontology based on the data source mapping profile for the identified data source. In some embodiments, the method further comprises applying a machine learning model to the output of the ADP or AFR process to generate the data source mapping profile. In various embodiments, the machine learning model comprises one or more of the following: one or more neural networks, one or more deep neural networks, one or more support vector machines (SVM), one or more Bayesian models, linear regression, logistic regression, or k-means clustering.

In another aspect, disclosed herein are systems comprising at least one computing device comprising at least one processor, a memory, and instructions executable by the at least one processor to create an application comprising: a software module identifying a data source associated with an automation environment and having a data source configuration; a software module retrieving data from identified data source; a software module generating a data source mapping profile specific to the data source configuration by performing operations comprising: identifying manufacturer documentation for the particular data source configuration; and utilizing an automated document processing (ADP) or automated form recognition (AFR) process to process details of the documentation; and a software module applying an algorithm to map the retrieved data to a predetermined ontology based on the data source mapping profile for the identified data source. In some embodiments, the application further comprises a software module applying a machine learning model to the output of the ADP or AFR process to generate the data source mapping profile. In various embodiments, the machine learning model comprises one or more of the following: one or more neural networks, one or more deep neural networks, one or more support vector machines (SVM), one or more Bayesian models, linear regression, logistic regression, or k-means clustering.

In another aspect, disclosed herein are computer-implemented methods comprising: identifying a data source associated with an automation environment and having a data source configuration; retrieving data from identified data source; generating a data source mapping profile specific to the data source configuration by performing operations comprising: identifying manufacturer documentation for the particular data source configuration; and applying a machine learning model to process details of the documentation; and applying an algorithm to map the retrieved data to a predetermined ontology based on the data source mapping profile for the identified data source. In various embodiments, the machine learning model comprises one or more of the following: one or more neural networks, one or more deep neural networks, one or more support vector machines (SVM), one or more Bayesian models, linear regression, logistic regression, or k-means clustering. In some embodiments, the method further comprises conducting human validation of the output of the machine learning model and utilizing the output of the human validation to improve the machine learning model.

In another aspect, disclosed herein are systems comprising at least one computing device comprising at least one processor, a memory, and instructions executable by the at least one processor to create an application comprising: a software module identifying a data source associated with an automation environment and having a data source configuration; a software module retrieving data from identified data source; a software module generating a data source mapping profile specific to the data source configuration by performing operations comprising: identifying manufacturer documentation for the particular data source configuration; and applying a machine learning model to process details of the documentation; and a software module applying an algorithm to map the retrieved data to a predetermined ontology based on the data source mapping profile for the identified data source. In various embodiments, the machine learning model comprises one or more of the following: one or more neural networks, one or more deep neural networks, one or more support vector machines (SVM), one or more Bayesian models, linear regression, logistic regression, or k-means clustering. In some embodiments, the application further comprises a software module feeding back output of a human validation process into the machine learning model.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
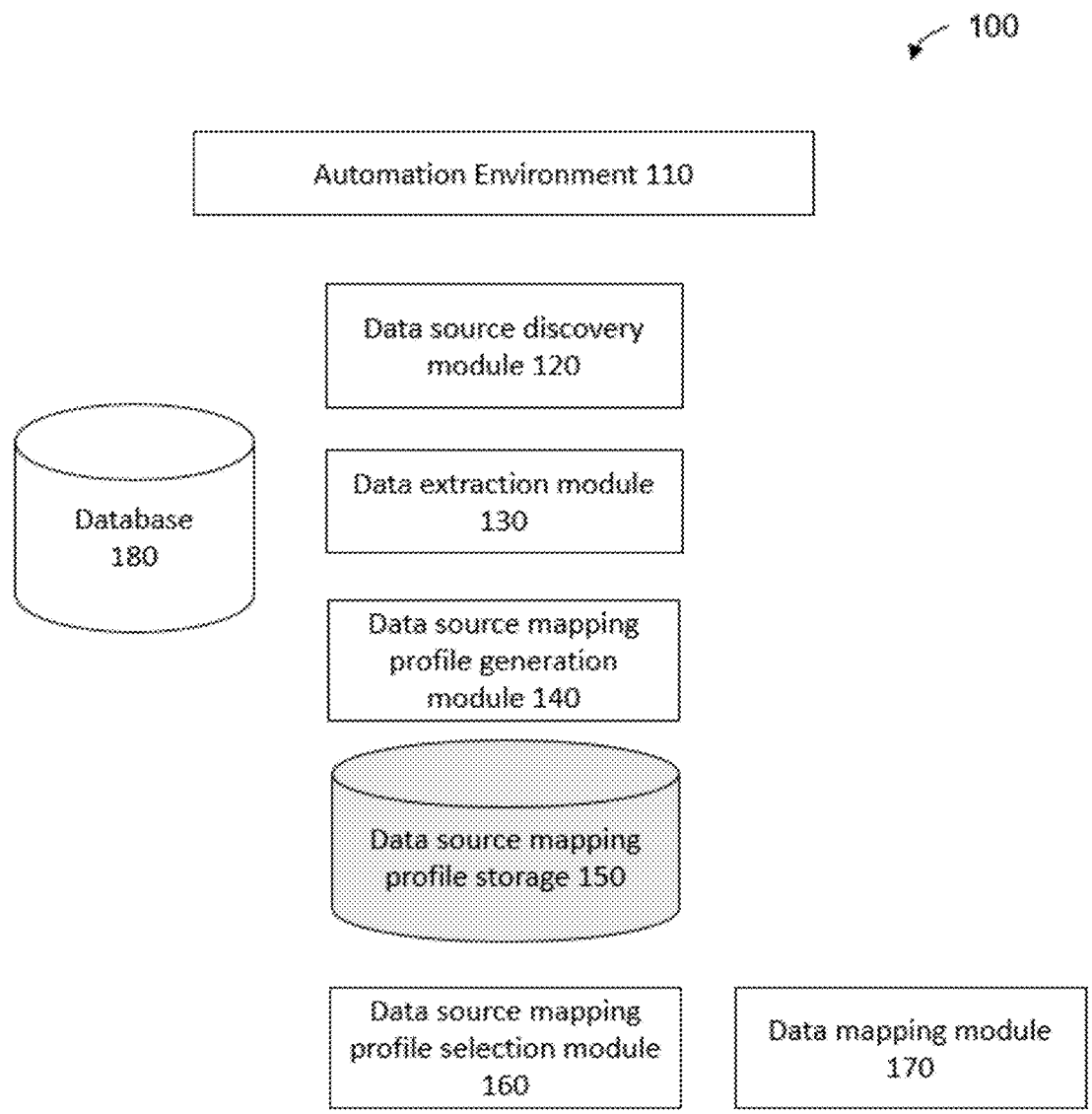
FIG. 1 shows a non-limiting example of a schematic diagram; in this case, a schematic diagram showing components (e.g., modules, mechanisms, etc.) utilized by embodiments described herein.

Described herein, in certain embodiments, are computer-implemented methods comprising: identifying a plurality of data sources associated with an automation environment, wherein each data source comprises a respective data source configuration; retrieving data from at least one of the identified data sources; generating a plurality of data source mapping profiles, each data source mapping profile specific to a particular data source configuration; maintaining a first data store comprising the plurality of data source mapping profiles; selecting a data source mapping profile specific to the respective data source configuration associated with each of the at least one identified data source; and applying a first algorithm to map the retrieved data to a predetermined ontology based on the selected data source mapping profile for the at least one identified data source.

Also described herein, in certain embodiments, are systems and platforms comprising at least one computing device comprising at least one processor, a memory, and instructions executable by the at least one processor to create an application comprising: a software module identifying a plurality of data sources associated with an automation environment, wherein each data source comprises a respective data source configuration; a software module retrieving data from at least one of the identified data sources; a software module generating a plurality of data source mapping profiles, each data source mapping profile specific to a particular data source configuration; a first data store comprising the plurality of data source mapping profiles; a software module selecting a data source mapping profile specific to the respective data source configuration associated with each of the at least one identified data source; and a software module applying a first algorithm to map the retrieved data to a predetermined ontology based on the selected data source mapping profile for the at least one identified data source.

Also described herein, in certain embodiments, are non-transitory computer-readable storage media encoded with instructions executable by one or more processors to provide an application comprising: a data source discovery module identifying a plurality of data sources associated with an automation environment, wherein each data source comprises a respective data source configuration; a data extraction module retrieving data from at least one of the identified data sources; a data source profiling module generating a plurality of data source mapping profiles, each data source mapping profile specific to a particular data source configuration; a first data store comprising the plurality of data source mapping profiles; a data source identification module selecting a data source mapping profile specific to the respective data source configuration associated with each of the at least one identified data source; and a data mapping module applying a first algorithm to map the retrieved data to a predetermined ontology based on the selected data source mapping profile for the at least one identified data source.

Also described herein, in certain embodiments, are computer-implemented methods comprising: identifying a data source associated with an automation environment and having a data source configuration; retrieving data from identified data source; generating a data source mapping profile specific to the data source configuration by performing operations comprising: identifying manufacturer documentation for the particular data source configuration; and utilizing an automated document processing (ADP) or automated form recognition (AFR) process to process details of the documentation; and applying an algorithm to map the retrieved data to a predetermined ontology based on the data source mapping profile for the identified data source.

Also described herein, in certain embodiments, are systems comprising at least one computing device comprising at least one processor, a memory, and instructions executable by the at least one processor to create an application comprising: a software module identifying a data source associated with an automation environment and having a data source configuration; a software module retrieving data from identified data source; a software module generating a data source mapping profile specific to the data source configuration by performing operations comprising: identifying manufacturer documentation for the particular data source configuration; and utilizing an automated document processing (ADP) or automated form recognition (AFR) process to process details of the documentation; and a software module applying an algorithm to map the retrieved data to a predetermined ontology based on the data source mapping profile for the identified data source.

Also described herein, in certain embodiments, are computer-implemented methods comprising: identifying a data source associated with an automation environment and having a data source configuration; retrieving data from identified data source; generating a data source mapping profile specific to the data source configuration by performing operations comprising: identifying manufacturer documentation for the particular data source configuration; and applying a machine learning model to process details of the documentation; and applying an algorithm to map the retrieved data to a predetermined ontology based on the data source mapping profile for the identified data source.

Also described herein, in certain embodiments, are systems comprising at least one computing device comprising at least one processor, a memory, and instructions executable by the at least one processor to create an application comprising: a software module identifying a data source associated with an automation environment and having a data source configuration; a software module retrieving data from identified data source; a software module generating a data source mapping profile specific to the data source configuration by performing operations comprising: identifying manufacturer documentation for the particular data source configuration; and applying a machine learning model to process details of the documentation; and a software module applying an algorithm to map the retrieved data to a predetermined ontology based on the data source mapping profile for the identified data source.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

As used herein, the "Internet of Things" or "IoT" refers to the network of physical devices, buildings, vehicles, and other objects that feature an IP address for internet network connectivity for exchanging data, wherein the network comprises, for example, ethernet, IP, serial buses, and/or other forms of communication between two or more IoT devices.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular structures, features, or characteristics may be combined in any suitable manner in one or more embodiments.

Automation Environment

In some embodiments, the platforms, systems, and methods described herein are implemented in relation to an automation environment. In further embodiments, the automation environment comprises electronically controllable equipment with one or more sensors, one or more actuators, and/or one or more effectors, as well as one or more automation controllers—either centralized and/or distributed. As this environment is the target of the logic and functionality described herein, the environment, in some cases, exists before the platforms, systems, and methods described herein are applied to it. In other cases, the environment is implemented with, e.g., proximate in time to, the platforms, systems, and methods described herein.

Many automation environments are suitable, including, by way of non-limiting examples, industrial environments, such as manufacturing environments and assembly environments, infrastructure, transportation, freight or shipping environments, smart cities, agricultural environments, military environments, law enforcement environments, commercial environments, such as smart building environments, smart office environments, healthcare environments, and retail environments, as well as residential environments, such as smart home environments, and the like. In some embodiments, the automation environments include cloud storage and/or computing system.

In various embodiments, the electronically controllable equipment comprises, by way of non-limiting examples, a smart manufacturing device (e.g., a robot, manufacturing actuator, assembly line sensor, etc.), a utility device (e.g., a water meter, transformer, gas meter, etc.), pipeline monitoring device, power plant monitoring device, electrical grid monitoring device, an environmental sensor (e.g., a carbon dioxide sensor, pollution detector, salinity meter, light meter, etc.), a weather sensor (e.g., humidity sensor, temperature sensor, rain gauge, anemometer, barometer, etc.), a transportation asset (e.g., a car, truck, watercraft, train, bus, aircraft, unmanned vehicle, GPS receiver, etc.), a freight or shipping asset (e.g., a shipping container, cargo, truck, rail car, watercraft, aircraft, etc.), a smart city device (e.g., a parking meter, utility meter, lighting device, traffic monitoring camera, emergency calling device, etc.), an agriculture device (e.g., a farming machine, soil sensor, irrigation device, etc.), a homeland security device (e.g., a body scanner, metal detector, radiation detector, biological agent detector, weapon, vehicle, drone, perimeter intrusion detector, gunfire locator, breathalyzer, etc.), a smart office device (e.g., an access control device, security system, HVAC system, vertical lifts, fire safety system, lighting system, printer, coffee maker, etc.), a point-of-sale (PoS) system (e.g., a payment device, receipt printer, barcode or QR code scanner, etc.), a health care device (e.g., a drug infusion pump, pacemaker, defibrillator, patient health monitoring device, etc.), as well as a smart home device (e.g., a security system, door lock, lighting device, appliance, thermostat, smoke detector, virtual assistant, smart speaker, etc.), and the like.

Data Sources

As described herein, in some embodiments, the automation environment comprises one or more pieces of electronically controllable equipment. In further embodiments, the electronically controllable equipment further comprises one or more of the following components: a microcontroller (MCU), a microprocessor (MPU), a memory or storage component, firmware, software, a networking/communications component, a sensing component (e.g., a sensor), an electronic circuit connected to the sensing component, an actuating component (e.g., an actuator and/or an effector), an electronic circuit connected to the actuating component, and an energy source. In some embodiments, one or more of the components are physically separate from a piece of electronically controllable equipment. In some embodiments, one or more of the components are integrated with, or embedded in, a piece of electronically controllable equipment.

In some embodiments, the automation environment comprises one or more cloud storage and/or computing systems, which in some cases are located remotely from the data integration pipeline. For example, some devices (e.g., pieces of electronically controllable equipment) are configured to communicate with a cloud storage and/or computing system. In these embodiments, the data integration pipeline discovers and/or extracts data from cloud APIs. In some embodiments, the data integration pipeline processes data both from on-premise systems and cloud systems.

In some embodiments, the networking/communication element includes a receiver, a transmitter, and/or a transceiver. In further embodiments, the networking/communication element comprises a radio frequency (RF) transceiver with an antenna or connection for an external antenna. Suitable transceivers include, by way of non-limiting examples, a Wi-Fi transceiver, a cellular transceiver, a Bluetooth transceiver, and the like.

In some embodiments, the electronically controllable equipment, or components thereof, comprises an IP address for internet connectivity. In further embodiments, the equipment may be associated with a MAC address or an SSID. It is understood that equipment may connect with other devices through wired or wireless connections, which allow for transfer (e.g., transmission, reception, or both) of data.

In some embodiments, the automation environment comprises one or more networks via which the electronically controllable equipment, or components thereof, sends and/or receives data. In various embodiments, the network comprises ethernet, IP, serial buses, and other forms of communication between two or more IoT devices. In further embodiments, the one or more networks comprise one or more IoT networks, one or more data packet-switched networks, one or more wireless sensor networks (WSN), and/or one or more wireless sensor and actuator networks (WSAN). In various embodiments, a network described herein is wireless network utilizing Wi-Fi, WiMAX, ZigBee, Z-Wave, Bluetooth, Bluetooth Low Energy (BLE), Near-Field Communication (NFC), or Light-Fidelity (Li-Fi). In some embodiments, a network described herein is wireless network utilizing LTE or 5G. In some embodiments, a network described herein is wireless network utilizing a low-power wide-area network (LPWAN) protocol, such as LoRa. In other embodiments, a network described herein is wired network utilizing Ethernet, serial, RS422 or RS485 serial bus, 1-Wire, CAN, DMX, or power line communication.

In some embodiments, one or more devices form nodes in the network. In some embodiments, a network described herein includes a central node for controlling the network. In some embodiments, the automation environment comprises electronically controllable equipment, or components there, that have hierarchical relationships, such as a controller/controlled relationship, a master/slave relationship, or the like. In some embodiments, a network described herein has a distributed architecture to reduce the impact of a failed device or node. In some embodiments, a network described herein consists of a peer-to-peer relationship between two or more devices.

The automation environment suitably comprises a wide range of numbers of data sources, including, by way of examples, pieces of electronically controllable equipment, local and remote data stores, and remote cloud computing services/resources, including APIs to provide data from remote computing services/resources. In various embodiments, the automation environment suitably comprises, by way of non-limiting examples, at least 5, at least 10, at least 50, at least 100, at least 500, at least 1,000, at least 5,000, at least 10,000, at least 50,000, or at least 100,000 data sources, including increments therein. In various further embodiments, the automation environment suitably comprises, by way of non-limiting examples, at least 500,000, at least 1,000,000, at least 5,000,000, at least 10,000,000, at least 50,000,000, at least 100,000,000, or at least 500,000,000 data sources, including increments therein.

In some embodiments, the automation environment comprises an automation controller, either centralized or distributed. For example, in some embodiments, the automation environment comprises one or more programmable logic controllers (PLC). A PLC is a microprocessor-based controller with programmable memory used to store program instructions and functions. In some embodiments, one or more of the PLCs are ruggedized. In various embodiments, a PLC comprises a processor unit (MCU or the MPU) which interprets inputs, executes the control program stored in memory, and sends output signals, a power supply unit which, in some cases, converts AC voltage to DC, a memory unit storing data from inputs and program instructions to be executed by the processor unit, an input and output interface, by which the PLC sends data to external devices and receives data from external devices, and a communications interface to receive and transmit data on communication networks. In further embodiments, a PLC comprises a real-time operating system, such as OS-9, Sedona, Niagara, or VxWorks. In various embodiments, PLC functionality includes, by way of examples, sequential relay control, motion control, process control, distributed control systems, and networking. In particular embodiments, a PLC is programmed with a device used to develop and later download a program into the memory of the PLC. The programming device, in various cases, includes a desktop console, special software on a personal computer, or a handheld programming device. In some cases, the program is downloaded to the PLC directly or over a network and stored either in non-volatile flash memory or battery-backed-up RAM.

In some embodiments, the MCU or the MPU receives data from a sensing component and transmits the data to the transmitter or transceiver to be transmitted to other remotely located elements within a network. In some embodiments, the receiver or transceiver receives data, for example, control data from remotely located devices, and such data gets relayed to the MCU or the MPU to generate commands to one or more other components. In such embodiments, a sensing component and/or an actuation component performs one or more functions(s) based on the received command. In some embodiments, an electrical circuit is utilized in data transfer among a sensing component, an actuation component, the MCU or MPU, and the networking/communications element.

Many sensors are suitable including, by way of non-limiting examples, GPS receivers, wearable sensors, mobile sensors, fixed sensors, and the like. In various embodiments, the electronically controllable equipment, or components thereof, and/or networks described herein comprise one or more of: an audio/acoustic sensor, a breathalyzer, a temperature sensor, a carbon dioxide sensor, a carbon monoxide sensor, an infrared sensor, an oxygen sensor, an ozone monitor, a pH sensor, a smoke detector, an electrical current sensor, an electrical voltage detector, a magnetometer, a metal detector, a radio direction finder, an air flow meter, an anemometer, a flow sensor, a gas meter, a water meter, a Geiger counter, an altimeter, an air speed indicator, a depth gauge, a gyroscope, a compass, an odometer, a shock detector, a barometer, a pressure gauge, a thermometer, a proximity sensor, a motion detector, an occupancy sensor, an inertial sensor, a gyroscope, or any combination thereof, and in some embodiments, sensor data comprises information obtained from any of the sensors described herein. Other examples of sensors include, but are not limited to, location sensors, vision sensors (e.g., imaging devices capable of detecting visible, infrared, or ultraviolet light, such as cameras, etc.), proximity sensors (e.g., ultrasonic sensors, LiDAR, time-of-flight cameras, etc.), inertial sensors (e.g., accelerometers, gyroscopes, inertial measurement units (IMUs), etc.), and field sensors (e.g., magnetometers, electromagnetic sensors, etc.). In particular embodiments, one or more sensors are configured to measure health parameters such as heart rate, pulse, electric signals from the heart, blood oxygen levels, blood pressure, blood sugar level, and the like. In particular embodiments, one or more sensors are configured to measure environmental parameters such as light, motion, temperature, pressure, humidity, vibration, magnetic field, sound, smoke, carbon monoxide, radiation, hazardous chemicals, acid, base, reactive compounds, volatile organic compounds, smog, and the like.

Any suitable number and combination of sensors can be used, such as one, two, three, four, five, or more sensors. Optionally, the data can be received from sensors of different types (e.g., two, three, four, five, or more types). Sensors of different types may measure different types of signals or information and/or utilize different types of measurement techniques to obtain data. For instance, the sensors may include any suitable combination of active sensors (e.g., sensors that generate and measure energy from their own source) and passive sensors (e.g., sensors that detect available energy).

Suitable actuators include, by way of non-limiting examples, electric (e.g., a motor, servo, solenoid, piezoelectric actuator, etc.), hydraulic, pneumatic (e.g., vacuum- or compressed gas-based actuators), magnetic, thermal (e.g., shape memory alloy-based actuators), soft, and mechanical actuators.

Suitable effectors include, by way of non-limiting examples, impactive, ingressive, astrictive, and contigutive effectors.

Overview of Exemplary Embodiments

The platforms, systems, and methods described herein interact with an automation environment and are implemented with multiple suitable architectures. Non-limiting examples are provided herein.

Referring to FIG. 1, in a particular embodiment, the platforms and systems 100 include, and methods utilize, an automation environment 110, a data source discovery module 120, a data extraction module 130, a data source mapping profile generation module 140, a data source mapping profile storage 150, a data source mapping profile selection module 160 and a data mapping module 170 in communication with a storage module 170 (which in some cases comprises a database). The data source profile storage 150 may be a sub-storage unit of the storage module 170.

Figure 2:
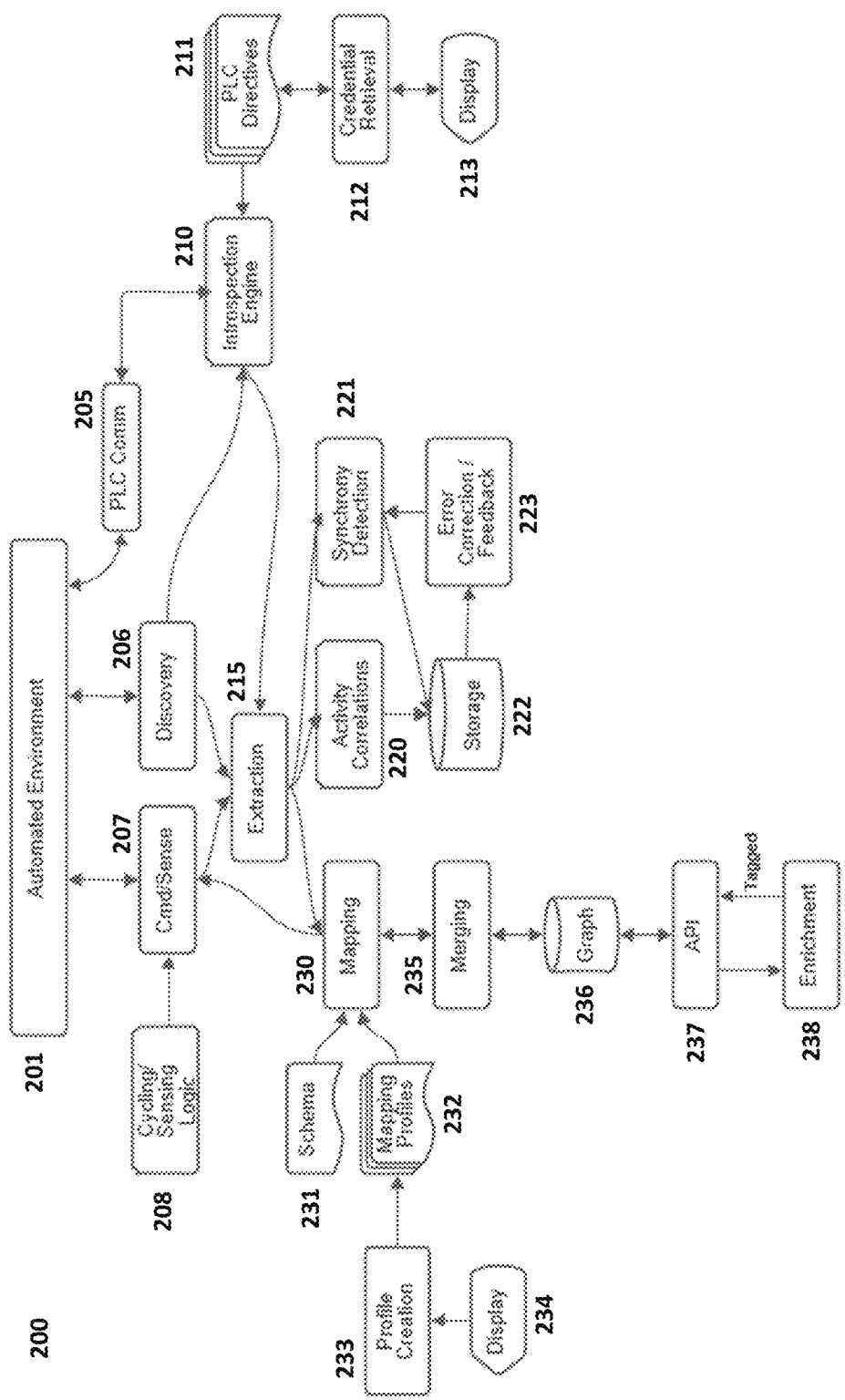
FIG. 2 shows a non-limiting example of a schematic diagram; in this case, a schematic diagram illustrating overall architecture and procedural aspects of the platforms, systems, and methods described herein.

Referring to FIG. 2, in a particular embodiment, the overall platforms and systems 200 are implemented in relation to an automation environment 201, and the methods utilize the automation environment 201. In this embodiment, a discovery module 206 and a command/sense module 207 interact directly with the automation environment 201 to conduct protocols to gain data about the environment and feed the data to an extraction module 215. The discovery module 206 provides data to an introspection engine 210, which communicates with a PLC communications module 205. In this embodiment, the introspection engine 210 receives one or more PLC directives 211, which may require credential retrieval 212 and presentation of an interface for showing credentials on a display 213 and/or receiving credentials, and the introspection engine 210 sends the PLC directives 211 to the PLC communications module 205 for issuance into the automation environment 201. Further, in this embodiment, a cycling/sensing logic module 208 provides instruction to the command/sense module 207 for interaction with the automation environment 201.

Continuing to refer to FIG. 2, in this particular embodiment, the command/sense module 207, the discovery module 206, and the introspection engine 210 provide data to the extraction module 215. In this embodiment, the extraction module 215 provides data to the activity correlations module 220 and the synchrony detection module 221, which are in communication with a storage module 222 and an error correction and feedback mechanism 223. In this embodiment, the extraction module 215 also provides data to the mapping module 230. By way of example, the mapping module 230 receives a mapping schema 231 and one or more mapping profiles 232, which may require profile creation 233 and presentation of an interface for showing profiles on a display 234 and/or receiving profiles. The mapping module 230 utilizes the schema 231 and the one or more profiles 232 to map the data extracted by the extraction module 215 and communicates the output to a merging module 235. Finally, in this embodiment, the merging module 235 is in communication with a graph database 236. An enrichment module 238 provides data enrichments, such as tagging (e.g., origin tagging, etc.), and access to the graph database 236 and the enrichments is provided via one or more APIs 237.

Figure 3:
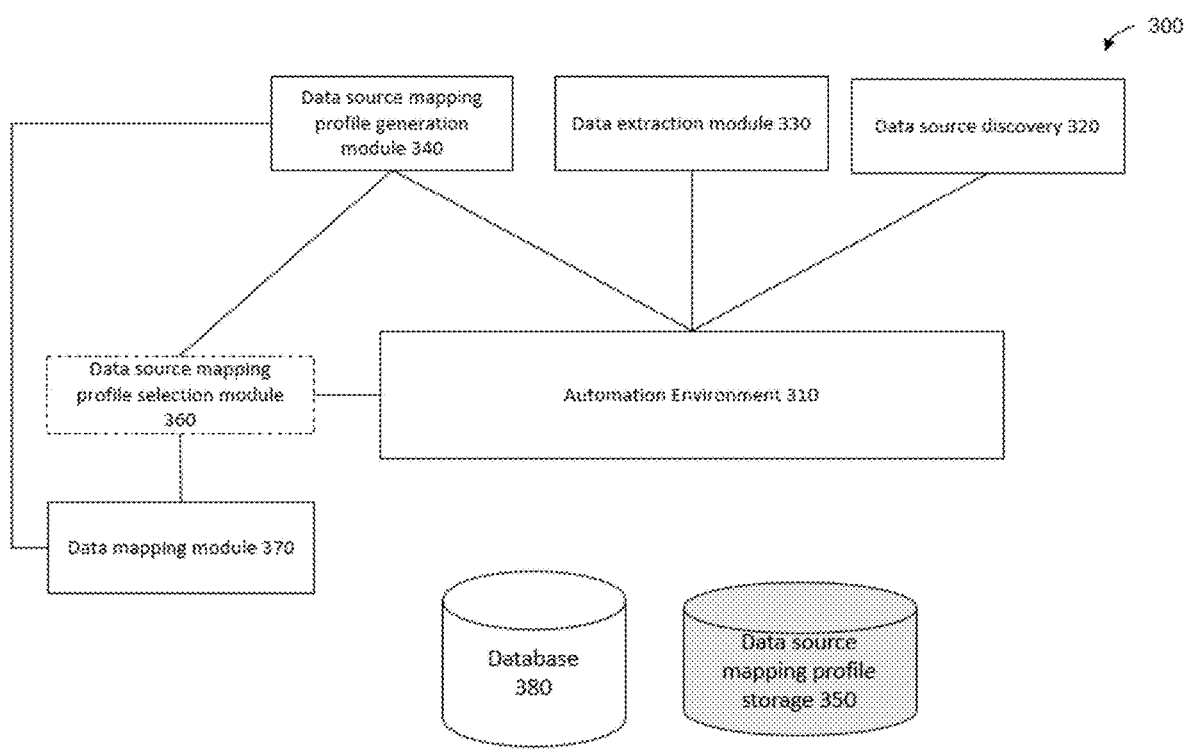
FIG. 3 shows a non-limiting example of a schematic diagram; in this case, a schematic diagram illustrating architecture and procedural aspects of the platforms, systems, and methods for generating data source mapping profile and mapping data according to embodiments described herein.

Referring to FIG. 3, in a particular embodiment, the automated data source profile generation and data mapping 300 is implemented in relation to an automation environment 310, and the methods utilize the automation environment 310. In this embodiment, a data source discovery module 320 interacts with the automation environment 310 to conduct protocols to gain data about the environment and to identify data sources in the automation environment 310. The data sources comprise data source configurations. The data extraction module 330 interact with the automation environment 310 and extract data from at least one of the identified data sources. The data source mapping profile generation module 340 interact with the automation environment 310 and generate a plurality of data source mapping profiles, wherein each data source mapping profile is specific to a particular data source configuration. The generated data source mapping profiles may be stored in the data source mapping profile storage 350. The data source mapping profile storage may be a sub-storage unit of the database 380. The data source mapping profile selection module 360 interact with the automation environment 310 and/or the data source mapping profile storage 350 and may select a data source mapping profile specific to the data source configuration associated with an identified data source. In some embodiments, the data source mapping profile selection module may be a sub-module of the data mapping module 370. The data source mapping module 370 interact with the automation environment 310 and may apply one or more algorithms to map the retrieve data to a predetermined ontology based on the selected data source mapping profile for an identified data source. The mapped data may be stored in the database 380, or merged into existing structured data in the database 380.

Figure 4:
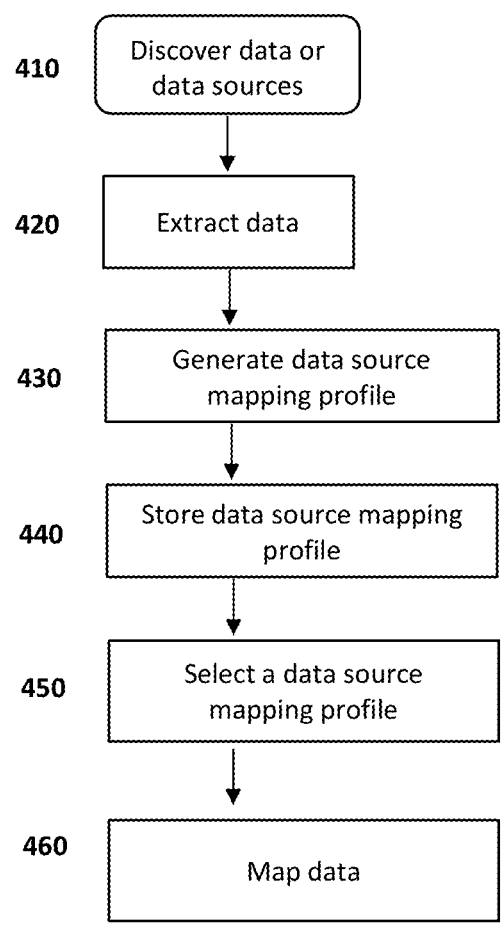
FIG. 4 shows a non-limiting example of a process flow diagram; in this case, a process flow diagram illustrating data source mapping profile generation and data mapping process according to embodiments described herein.

Referring to FIG. 4, in a particular embodiment, a process for generating data source mapping profile and mapping data to an ontology 400 begins with discovery of one or more data and/or data sources 410. Discovery, in this embodiment, comprises one or more of passive discovery, active discovery, and target interrogation methodologies. The identified data sources comprise data source configurations. The next step is to extract/retrieve data 420 from some or all of the discovered data (e.g., data files, data shares, data repositories, or data resources and/or some or all of the discovered data sources (e.g., controllers, hubs, IoT devices, sensors, actuators, and the like). In this embodiment, extraction comprises sending one or more instructions and/or requests to each data source, utilizing the automation protocol native to each data source. Further, in this embodiment, data extraction is performed on a schedule, in response to an event, or pushed from the source directly to an extraction module, or a combination of these, on an overall, per data source, or per group of data source basis. Next, data source mapping profile is generated 430 from the identified data sources, wherein each data source mapping profile is specific to a particular data source configuration. Next, the generated data source mapping profile is stored 440 to a storage system. Next, the platforms and systems of the present disclosure may select 450 a data source mapping profile (e.g., from the stored data source mapping profiles) for an identified data source based, at least in part, on the data source configuration associated with the identified data source. Next, the extracted data from an identified data source is mapped 460 from the source format to an ontology, according to a schema and a plurality of mapping profiles. In some embodiments, the platforms and systems of the present disclosure may apply one or more algorithms to the extracted data, based on the selected data source mapping profile, to map the retrieved/extracted data to a predetermined ontology.

Data or Data Source Discovery Mechanism

One component of the platforms and systems described herein, and utilized by the methods described herein is the data or data source discovery mechanism. See, e.g., FIG. 1 at 120, FIG. 2 at 206, and FIG. 3 at 320. This will vary based on the environment the system is targeting but, in various embodiments, includes one or more of: passive discovery, active discovery, and target interrogation. As described elsewhere herein, the automation environment comprises at least one networked industrial or commercial automation system. The data sources (IoT devices) comprise devices utilizing a first communication protocol and devices utilizing a second communication protocol; the first communication protocol is different than the second communication protocol. Passive discovery is typically done by observing network traffic, whether IP, serial, or otherwise, between the potential data sources. When a known protocol is used, the origin and destination are recorded as a potential data source. Active discovery comprises IP subnet scanning on a network, port scanning on a network, issuing protocol specific discovery commands on a network, or a combination thereof. Active discovery is usually protocol specific, but can range from "whois" commands in protocols like BACnet to IP subnet and port scanning for IP based systems. Again, when a device is found that speaks a desired protocol, it is recorded as a potential data source. Lastly, target interrogation includes actively speaking one or more protocols to a potential target to obtain additional information. Target interrogation comprises introspecting at least one PLC on a network. In general, a known or discovered device is interrogated to find out about other known devices—and when more devices are found, they are similarly interrogated. Additionally, data sources can also be found in file shares or be manually entered, such as a cloud service. In some embodiments, the data source comprises a data source configuration.

A particular exemplary methodology for target interrogation is found in U.S. patent application Ser. No. 17/372,275, entitled SUBTENDED DEVICE MAPPING THROUGH CONTROLLER INTROSPECTION, filed on Jul. 9, 2021 and listing as inventors Shaun Cooley, Jose de Castro, and Jason Koh, which is hereby incorporated by reference in its entirety. This exemplary methodology utilizes communication methods set up for programming and configuration of controllers by human technicians. A collection of protocol specific PLC introspection directives is assembled. Each of these directives drives an introspection engine to reach in to the controller to obtain the necessary information. The engine obtains the make/model of a controller, finding the appropriate introspection directives, executing the sequence of commands, and then processing the final output. In this example, the data or data source discovery mechanism discovers devices that are subtended to a controller by masquerading as a human technician in order to obtain the controller's internal configuration and programming.

Data Extraction System

Another component of the platforms and systems described herein, and utilized by the methods described herein is the data extraction mechanism. See, e.g., FIG. 1 at 130, FIG. 2 at 215, and FIG. 3 at 330. After the data or data source discovery mechanism produces a list of potential data sources, the data extraction component is responsible for extracting data from each source. This is done by leveraging the native protocol, such as BACnet, modbus, S7, or other automation protocol that the source is able to speak or respond on, or the file format if pulling data from a file, such as a CSV. In various embodiments, data is retrieved on a schedule, in response to an event, as a result of passively observing communications among data sources, or pushed from the source directly to this extraction component, or some combination of these. As this component receives data, it actively forwards it to the mapping mechanism, which typically transits a network. In preferred embodiments, the receiving end of this data would store the data in its raw form so that the raw data could be replayed in to the system if any of the subsequent components are improved after the data's initial pass through the system. In some embodiments, the extracted/retrieved data comprises a unique address for the data source. In some other embodiments, the extracted/retrieved data comprises a make, model, firmware, or a combination thereof for the data source.

Data Source Mapping Profile Generation Mechanism

Another component of the platforms and systems described herein, and utilized by the methods described herein is the data source mapping profile generation mechanism. See, e.g., FIG. 1 at 140, FIG. 2 at 233, and FIG. 3 at 340. The data source mapping profile generation mechanism is responsible for generating data source mapping profile specific to a particular data source configuration. In some embodiment, the data source mapping profile generation mechanism may identify manufacturer documentation for the particular data source configuration and utilize an automated document processing (ADP) or automated form generation (AFP) process to process details of the documentation. ADP and AFP may capture the data fields from the documentation and generate a digitally intelligible set of organized profile. In some embodiments, the process can involve extracting the structure of the document, identify the target data fields, by utilizing computer vision algorithms, convolutional neural networks, etc. In some embodiments, a pre-defined template may be utilized, which details the data fields that the data source mapping profile generation mechanism is targeting. The resulted digitally intelligible set of organized profile can be used later as data source mapping profile, to map the extracted data to an ontology. The output of the ADP or AFP process may feed into a machine learning (ML) model to generate the data source mapping profile. The ML model comprises one or more of the following: one or more neural networks, one or more deep neural networks, one or more support vector machines (SVM), one or more Bayesian models, linear regression, logistic regression, or k-means clustering. In some other embodiments, the data source mapping profile generation mechanism may identify manufacturer documentation for the particular data source configuration and apply a ML model to process details of the documentation. Similarly, the ML model comprises one or more of the following: one or more neural networks, one or more deep neural networks, one or more support vector machines (SVM), one or more Bayesian models, linear regression, logistic regression, or k-means clustering. In some cases, human validation of the output of the ML model is conducted and the human validation may be utilized to further train the ML model to improve the accuracies and effectiveness of the ML model. The generated data source mapping profiles are specific to a particular data source configuration, and may be utilized subsequently to map the extracted data to an ontology.

Data Store of Mapping Profiles

Another component of the platforms and systems described herein, and utilized by the methods described herein is data source mapping profile storage mechanism. See, e.g., FIG. 1 at 150, FIG. 2 at 232, and FIG. 3 at 350. The data source mapping profile storage mechanism is responsible for storing data source mapping profiles in a first data store. In some embodiments, the generated data source mapping profiles are specific to a number of particular data source configurations. The specific data source configurations may be indexed and stored with the data source mapping profiles in the first data store.

Data Source Mapping Profile Selection Mechanism

Another component of the platforms and systems described herein, and utilized by the methods described herein is data source mapping profile selection mechanism. See, e.g., FIG. 1 at 160, FIG. 2 at 232, and FIG. 3 at 360. The data source mapping profile selection mechanism is responsible for selecting a data source mapping profile for an identified data source based on the data source configuration associated with the identified data source. In some embodiment, the data source mapping profile is selected based at least in part on the retrieved data from the identified data source. In some embodiments, the data source mapping profile selection mechanism query the first data store for appropriate data source mapping profile based on the data source configuration. In some other embodiments, if the identified data source is associated with a new data source configuration, for which a data source mapping profile is not generated yet (e.g., the query comes back as 'not found'), the platforms and systems of the present disclosure may generate data source mapping profile that is specific to this data source configuration. The details of generating data source mapping profile are described elsewhere herein. Once a data source mapping profile is selected, the data source mapping profile selection mechanism may transmit the selected data source mapping profile to the data mapping mechanism for further data mapping. In some embodiments, the data source mapping profile selection component may be a sub-component of the data mapping mechanism.

Data Mapping Mechanism

Another component of the platforms and systems described herein, and utilized by the methods described herein is the data mapping mechanism. See, e.g., FIG. 1 at 170, FIG. 2 at 230, and FIG. 3 at 370. The mapping mechanism is responsible for mapping data from the source format to an ontology, such as a strongly-typed ontology, used by subsequent components in the pipeline. This component optionally comprises a manually crafted set of mapping rules or logic (including those comprising one or more heuristics) to take a known input schema and produce an output schema, such as an XSLT file (Extensible Stylesheet Language Transformations) or even simple field mapping (A→7). In some embodiments, this mapping mechanism optionally comprises complex machine learning based transformation that is trained from interactive data transformation performed by humans or by the data integration pipeline, which improves over time. Example machine learning models include, by way of examples, regular or deep neural networks, support vector machines, Bayesian models, linear regression, logistic regression, k-means clustering, or the like. This exemplary methodology utilizes a data mapping mechanism positioned between the discovered devices and the target schema or ontology and is responsible for converting the data extracted from devices to the target ontology by applying device mapping profiles that were looked up in the storage and lookup system for device mapping profiles using the make/model/firmware or fingerprint of extracted from the device providing data.

In some embodiments, the mapping mechanism applies a first algorithm to map the retrieved data to a predetermined ontology based on the selected data source mapping profile for the identified data source. The first algorithm comprises a logic schema, a set of rules, a ML model, a statistical model, or a combination thereof. In some cases, the first algorithm executes instructions in a domain specific language (DSL) that provides mapping instructions. In some other cases, the first algorithm executes instructions in a general purpose language that provides mapping instructions. For example, the mapping mechanism may receive the selected data source mapping profile for the identified data source based on the data source configuration. The selected data source mapping profile may provide descriptions for the data fields to map the extracted data. The first algorithm may then be applied to the extracted data based on the data field descriptions of the data source mapping profile. In this manner, the extracted data of data sources may be mapped to a normalized format based on the predetermined ontology. The predetermined ontology may describe all the equipment functions, properties, and data from the data source associated with the automation environment.

Data Merging Method

Another component of the platforms and systems described herein, and utilized by the methods described herein is the data merging mechanism. See, e.g., FIG. 2 at 235. The data merging method takes data that has been mapped to the system's ontology by the mapping component and merges it into the data storage mechanism, described elsewhere herein. It is important that the mapped data is merged and not just simply loaded as the data storage mechanism contains a living representation of the data, the relationships among the data, and any enrichments that were introduced by subsequent components. Simply loading the data would introduce a static view of data that is incapable of evolving further and similarly wouldn't align with the enriched and evolved model. The merge process, in some embodiments, includes matching mapped source data with evolved vertices in the graph (e.g., in a second storage, a graph database), which optionally involves knowing both provenance and history of each vertex in the graph. In further embodiments, once matched, any new properties, shape details, or relationships can be merged into the matched vertices and any timeseries data recorded in the vertex's timeseries store. At this point data is simultaneously available to API callers, stream destinations, and the enrichment mechanisms.

Graph Database

Another component of the platforms and systems described herein, and utilized by the methods described herein is the data storage mechanism. See, e.g., FIG. 1 at 180, FIG. 2 at 236, and FIG. 3 at 380. In preferred embodiments, a graph database is used wherein each vertex in the graph also has a timeseries store to capture data changes over time. Although a timeseries store and a graph database are designed for completely different data models, a federation of the two allows subsequent components and end users of data to easily retrieve timeseries data without concern for structural enrichments that occur in the graph. Other specialized databases could also be added into this federation framework, such as structural data or document stores. It is important that heterogeneous data moving through the pipeline is stored so that it can be further processed and enriched.

Data Enrichment Mechanism

Another component of the platforms and systems described herein, and utilized by the methods described herein is the data enrichment mechanism. See, e.g., FIG. 2 at 238. Data enrichment mechanisms watch the real-time stream of graph and timeseries data in order to enrich the graph by creating, updating, or deleting vertices, edges (relationships), or vertex/edge properties in the graph. In general, these enrichment mechanisms look for patterns in the graph, the timeseries, or both through mechanisms such as simple pattern matching, statistical analysis, machine learning, or even human processing.

A particular exemplary methodology for data enrichment is found in U.S. patent application Ser. No. 17/372,251, entitled GRAPH DATA ENRICHMENT, filed on Jul. 9, 2021 and listing as inventors Shaun Cooley, Jose de Castro, and Jason Koh, which is hereby incorporated by reference in its entirety. This exemplary methodology utilizes a mechanism to allow downstream processing of graph structure and data to feed back into the graph in order to benefit all other users of the graph through real-time enrichment of vertices, edges, and related data within the graph database. First, in this example, updates to the graph, timeseries data, or both are received, e.g., by scheduled polling of the graph or timeseries data through queries, polling of a changelog, or a real-time feed of changes in the graph or timeseries data being pushed to interested parties (local to the graph or remote). Second, in this example, data enrichments are produced, e.g., by one or more mechanisms in or out of band. In preferred embodiments, multiple instances of data enrichment mechanisms are each configured to produce a specific enrichment and receive graph or timeseries data updates and analyze the new state of the graph through rules based, heuristic, statistical, or machine learning based systems to determine if an enrichment should be created, updated, or deleted. Finally, in this example, enrichments are contributed back to the graph database, timeseries data, or both with origin tagging, e.g., by receiving a stream of vertex, edge, and property creation, update, and delete requests from the various instances of the data enrichment(s) components, and merging the deltas into the graph. In preferred embodiments, each delta merged into the graph is tagged with the identity of the enrichment component that created it (e.g., origin tagging) so that future updates or deletions can be properly applied, thus avoiding duplicate or abandoned elements in the graph.

Further examples of data enrichment are provided in U.S. patent application Ser. No. 17/372,238, entitled AUTOMATIC DISCOVERY OF RELATIONSHIPS AMONG EQUIPMENT THROUGH AUTOMATED CYCLING AND OBSERVATION, filed on Jul. 9, 2021 and listing as inventors Shaun Cooley, Jose de Castro, and Jason Koh, U.S. patent application Ser. No. 17/372,242, entitled AUTOMATIC DISCOVERY OF RELATIONSHIPS AMONG EQUIPMENT THROUGH OBSERVATION OVER TIME, filed on Jul. 9, 2021 and listing as inventors Shaun Cooley, Jose de Castro, and Jason Koh, and U.S. patent application Ser. No. 17/372,267, entitled AUTOMATIC DISCOVERY OF AUTOMATED DIGITAL SYSTEMS THROUGH LINK SALIENCE, filed on Jul. 9, 2021 and listing as inventors Shaun Cooley, Jose de Castro, and Jason Koh, each of which are hereby incorporated by reference in its entirety.

APIs and Streams for Accessing the Normalized, Merged, and Enriched Data

Another component of the platforms and systems described herein, and utilized by the methods described herein is one or more APIs and/or real-time data streams and/or live data feeds. See, e.g., FIG. 2 at 237. The last component needed for the platforms, systems, and methods described herein is some combination of APIs and streams for accessing the normalized, merged, and enriched data. While this data pipeline adds immense value to the original raw data that entered the pipeline, the resulting data would be useless if it couldn't be accessed. In various embodiments, the final destination of the processed data is other applications, running either locally or remotely, that will access the data either by polling an API for new data or using a callback, webhook, or web socket type mechanism to receive a stream of data in real-time. These applications must also be aware of any enrichments that came into existence after the initial delivery of data, so all delivered data must be uniquely identifiable so subsequent updates can be correlated.

In a preferred embodiment, this pipeline can also process data in reverse to push changes that are made to the data storage system, by enrichment mechanisms or other users of the API, back through the merging and mapping component and in to the automation environment as commands.

Computing System

Figure 5:
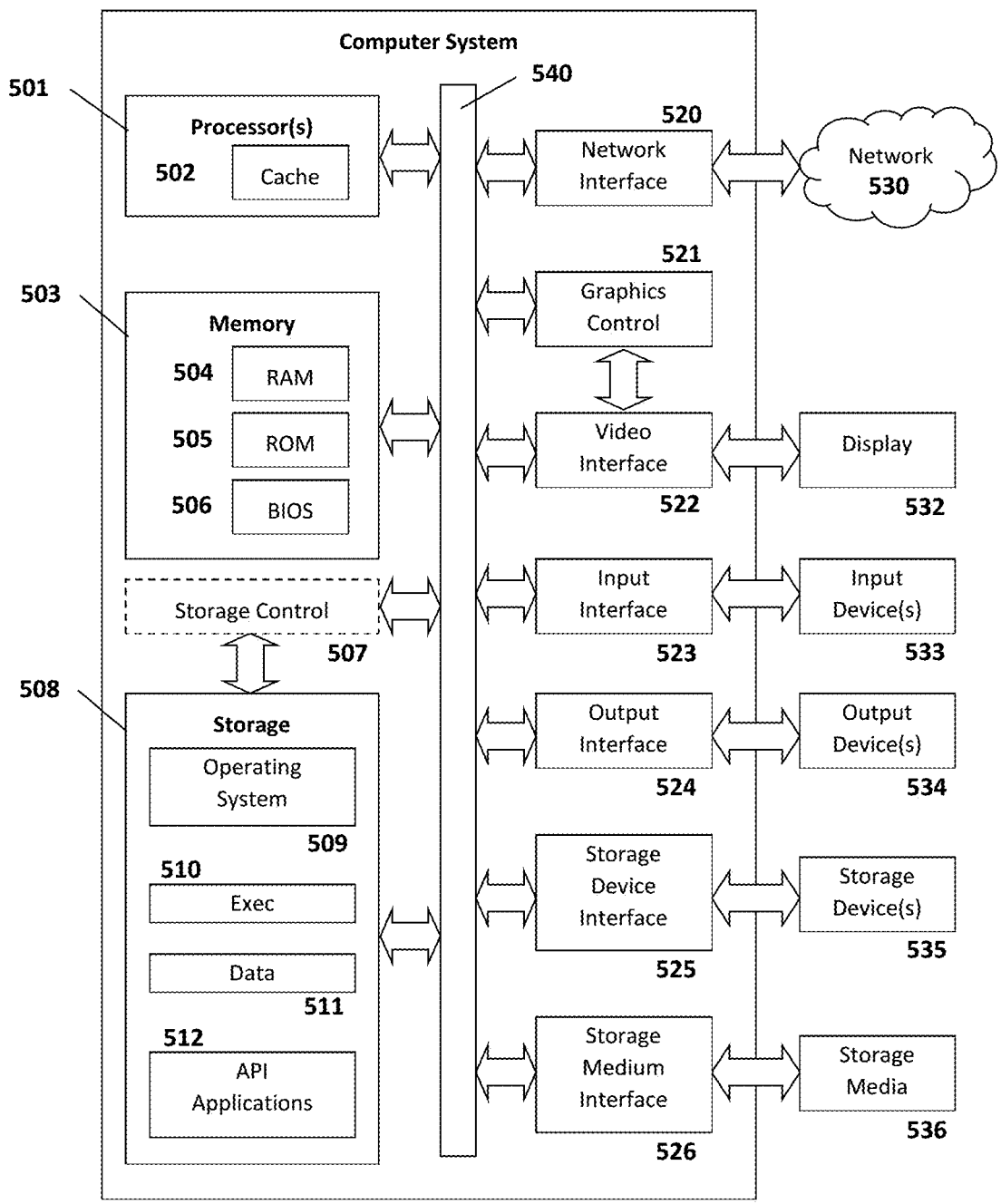
FIG. 5 shows a non-limiting example of a computing device; in this case, a device with one or more processors, memory, storage, and a network interface.

Referring to FIG. 5, a block diagram is shown depicting an exemplary machine that includes a computer system 500 (e.g., a processing or computing system) within which a set of instructions can execute for causing a device to perform or execute any one or more of the aspects and/or methodologies for static code scheduling of the present disclosure. The components in FIG. 5 are examples only and do not limit the scope of use or functionality of any hardware, software, embedded logic component, or a combination of two or more such components implementing particular embodiments.

Computer system 500 may include one or more processors 501, a memory 503, and a storage 508 that communicate with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various tangible storage media 536. All of these elements may interface directly or via one or more interfaces or adaptors to the bus 540. For instance, the various tangible storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 500 includes one or more processor(s) 501 (e.g., central processing units (CPUs), general purpose graphics processing units (GPGPUs), or quantum processing units (QPUs)) that carry out functions. Processor(s) 501 optionally contains a cache memory unit 502 for temporary local storage of instructions, data, or computer addresses. Processor(s) 501 are configured to assist in execution of computer readable instructions. Computer system 500 may provide functionality for the components depicted in FIG. 5 as a result of the processor(s) 501 executing non-transitory, processor-executable instructions embodied in one or more tangible computer-readable storage media, such as memory 503, storage 508, storage devices 535, and/or storage medium 536. The computer-readable media may store software that implements particular embodiments, and processor(s) 501 may execute the software. Memory 503 may read the software from one or more other computer-readable media (such as mass storage device(s) 535, 536) or from one or more other sources through a suitable interface, such as network interface 520. The software may cause processor(s) 501 to carry out one or more processes or one or more steps of one or more processes described or illustrated herein.

Carrying out such processes or steps may include defining data structures stored in memory 503 and modifying the data structures as directed by the software.

The memory 503 may include various components (e.g., machine readable media) including, but not limited to, a random access memory component (e.g., RAM 504) (e.g., static RAM (SRAM), dynamic RAM (DRAM), ferroelectric random access memory (FRAM), phase-change random access memory (PRAM), etc.), a read-only memory component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable tangible computer-readable media described below. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable tangible computer-readable media described herein. Storage 508 may be used to store operating system 509, executable(s) 510, data 511, applications 512 (application programs), and the like. Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide non-volatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, specifically mobile devices and enterprise systems, distributed computing systems, cloud storage systems, cloud computing systems, and the like, connected to network 530. The network 530 may comprise ethernet, IP, serial buses, and other forms of communication between two or more IoT devices. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 530, may employ a wired and/or a wireless mode of communication. In general, any network topology may be used.

Information and data can be displayed through a display 532. Examples of a display 532 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 532, computer system 500 may include one or more other peripheral output devices 534 including, but not limited to, an audio speaker, a printer, a storage device, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, and vehicles.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Pythonυ, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash HTML 5, Apple® QuickTime®, Microsoft® Silverlight Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of, for example, automation environment information, data source information, event information, state change information, combinatorial pair information, algorithm information, and relationship information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, MongoDB, and the like. Suitable graph databases include, by way of non-limiting examples, ArangoDB, AnzoGraph DB, JanusGraph, Neo4j, Sparksee, Sqrrl Enterprise, and the like. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative examples are representative of embodiments of the software applications, systems, and methods described herein and are not meant to be limiting in any way.

Example 1

Use Case

In one of the use cases, Company A buys a Factory B, or Company A is looking to integrate data of an existing facility Factory B with another set of data (e.g., data from a Warehouse C owned by Company A) to provide better visibility of the operation of Factory B and/or Warehouse C. In many instances, Factory B may include a number of pieces of equipment that are connected to the internet that feature an IP address, i.e., IoT devices. However, if the accumulated data associated with the IoT devices is generated across a long period of time according to different standards by different service providers, it is quite possible that the data is not in a format that is readily understandable by Company A, and thus cannot provide actionable insight for Company A. For example, the data format may be in a proprietary format that is not useful for people in Company A to understand the operation of Factory B. In some cases, even the same type of IoT devices within one facility (e.g., Factory B), for example, HVAC systems, may be manufactured by different vendors and thus may be operating via different protocols, configurations, and settings. In these cases, it can be very difficult to map the data from these IoT devices into a useful format and provide to Company A.

Factory B may be an example of an automated environment (e.g., IoT-connected ecosystem). The automated environment of Factory B may comprise electronically controllable equipment. For example, an automobile manufacturing Factory B has assembly line with sensors, actuators, and effectors, lighting systems, HVAC systems with temperature sensors, etc. It will be obvious to those skilled in the art that such electronically controllable equipment and/or devices are provided by way of example only. Each of these pieces of electronically controllable equipment and/or devices may be internet-connected and thus provide data for the operator of Factory B and the management team of Company A. Company A may also own other automobile manufacturing Factories H, I, and J, and a Warehouse C which stores parts for installation, such as brake components for cars. In many cases, each of the facilities B, H, I, J and C has tens of thousands of devices producing data, and they spread across millions of square feet, and use a multitude of protocols. Due to the lack of interoperability between the variety of IoT devices, in terms of both hardware variations and differences in the software running on them, it is hard to develop applications that work across the entire enterprise (i.e., Company A in this example). The following operations explain the solutions provided by the present subject matter to the above-mentioned problems.

The method provided by the present subject matter identifies a plurality of data sources associated with an automation environment. For example, a number of IoT devices are identified as data sources because they are capable of generating data associated with their operation respectively. The assembly line sensors, lighting system sensors, temperature sensors, etc. of Factory B may be identified as data sources in this case. The data source identification process may involve passive discovery, active discovery, and/or target interrogation. In some case, the passive discovery comprises observing traffic on a network, identifying an origin or a destination of the traffic on the network, and the like. In some cases, the active discovery comprises IP subnet scanning on a network, port scanning on a network, issuing protocol specific discovery commands on a network, or a combination thereof. In some cases, the target interrogation comprises introspecting at least one PLC on a network. By ways of these data source discovery methods, a variety of other IoT devices of Factories H, I, and J, and a Warehouse C are identified as data sources via the same data source identification process. These IoT devices are associated with respective data source configurations. For example, one identified IoT device from Factory B may be a HVAC unit (HVAC No. 1) manufactured by Vendor H, and the HVAC No. 1 has a configuration that is based on the configurations that Vendor H uses. Another identified IoT device also from Factory B may be a HVAC unit (HVAC No. 2) manufactured by Vendor I, and the HVAC No. 2 has a configuration that is based on the configuration that Vendor I uses. Therefore, it is likely that the two identified data sources (IoT devices, in this case, the HVAC No. 1 and HVAC No. 2) do not have the same configurations. This difference between configurations may lead to the difficulties for a data owner (e.g., an operator of Factory B, the management team of Company A, etc.) to gain meaningfully understanding of the data from these HVAC units. For example, the communication protocols may be different between the HVAC No. 1 and HVAC No. 2, and the data format and structure may be different as well. Conventionally, to gain meaningful understanding of the data from these IoT devices, it may require manual mapping of the data from the source data fields to the destination data fields and then display the mapped data in a dashboard and provide the analytics of the presented data. This process can be time and labor consuming and prong to human errors.

After the data source discovery and/or data source identification mechanism produces a list of potential data sources, the data extraction component may retrieve data from these potential data sources. In some cases, the retrieved data a unique address (e.g., physical address, virtual address, MAC address, hush of MAC address, etc.) for the data source (e.g., IoT device). In some cases, the retrieved data comprises a unique fingerprint identifying the data source. The data extraction/retrieving component may retrieve data on a schedule, in response to an event, as a result of passively observing communications among the data sources, or a combination thereof. For example, the data extraction component may retrieve temperature data from the temperature sensors. The temperature data may be associated with a timestamp indicating the temperature at a particular time of a day/week/month/year. The temperature data may also be associated with a location identifier indicating the temperature at a particular location of the facility. In another example, the data extraction component may retrieve installation speed data from the assembly line sensors. The installation speed data may indicate the speed that parts (e.g., car engines, brake components, wheels, etc.) are fed into the assembly lines. In some other cases, the installation speed data may indicate the speed that an installation is finished by the assembly line. The data extraction component may retrieve lighting data from the lighting system. The lighting data may be associated with a timestamp indicating whether the light is on at a particular time of a day/week/month/year and potentially the luminance. The lighting data may also be associated with a location identifier indicating where the lighting data is collected. In some other examples, the data extraction component may retrieve inventory data from an inventory sensor in the Warehouse C. The inventory data may indicate the amount of parts (e.g., engines, brake components, wheels, etc.) that are in stock in the Warehouse C. Additionally, the data extraction component may retrieve transportation data from a fleet of trucks that transport parts between Warehouse C and Factories B, H, I, and J. The transportation data may indicate the transportation capacity of the fleet of trucks, idling durations of the trucks, and the time durations required for delivery across different time of a day (i.e., rush hours vs. non-rush hours), different time of a week (i.e., weekdays vs. weekend), different time of a year (i.e., winter time with closed highways vs. summer time with no potential closures).

The data source mapping profile generation component may generate data source mapping profile for each of the data source configuration. In some embodiment, the data source mapping profile generation mechanism may identify manufacturer documentation for the particular data source configuration and utilize an automated document processing (ADP) or automated form generation (AFP) process to process details of the documentation. ADP and AFP may capture the data fields from the documentation and generate a digitally intelligible set of organized profile. Referring to the above example, the HVAC No. 1 and HVAC No. 2 may have different configurations. These configurations may be buried in manufacturer documentation, which can be hundreds of pages. In some embodiments, the process can involve extracting the structure of the document, identify the target data fields, by utilizing computer vision algorithms, convolutional neural networks, etc. In some embodiments, a pre-defined template may be utilized, which details the data fields that the data source mapping profile generation mechanism is targeting. The resulted digitally intelligible set of organized profile can be used later as data source mapping profile, to map the extracted data to an ontology. The output of the ADP or AFP process may feed into a machine learning (ML) model to generate the data source mapping profile. The ML model comprises one or more of the following: one or more neural networks, one or more deep neural networks, one or more support vector machines (SVM), one or more Bayesian models, linear regression, logistic regression, or k-means clustering. In some other embodiments, the data source mapping profile generation mechanism may identify manufacturer documentation for the particular data source configuration and apply a ML model to process details of the documentation. Similarly, the ML model comprises one or more of the following: one or more neural networks, one or more deep neural networks, one or more support vector machines (SVM), one or more Bayesian models, linear regression, logistic regression, or k-means clustering. In some cases, human validation of the output of the ML model is conducted and the human validation may be utilized to further train the ML model to improve the accuracies and effectiveness of the ML model. For example, according to the manufacturer documentation from Vendor H (the manufacturer for HVAC No. 1), HVAC No. 1 may generate data in a relational data structure with a set of data fields (e.g., 6 data fields). One piece of output data from HVAC No. 1 may be the reading of temperature sensor O associated with or built in the HVAC No. 1, and the data format is in Celsius and Swiss date format. For example, the temperature data of sensor O is 27° C. at (dd.mm.yyyy). There may be other pieces of output data from the HVAC No. 1, such as a temperature set point, readings from humidity and pressure sensors built in the HVAC unit, schedules in terms of occupied time and vacation time, settings for the occupied time and vacation time, etc. Based on the models and makes of the HVAC units, it is likely that one HVAC unit is more sophisticated and has hundreds of data fields, and another HVAC unit is for a simple use and only had a few data fields. By performing ADP or AFP process and/or the ML model on the manufacturer documentation from different vendors, the data source mapping profile generation component may generate data source mapping profile for each of the data source configuration. The data source mapping profile may be seen as a roadmap for translating the extracted data from different data source to a normalized format for later use. The generated data source mapping profiles are specific to a particular data source configuration, and may be utilized subsequently to map the extracted data to an ontology.

Once a data source mapping profile is generated, it is store in the data source mapping profile storage. The specific data source configurations may be indexed and stored with the data source mapping profiles. For example, if there is a data source mapping profile generated for HVAC system manufactured by Vendor H, it may be stored as a Mapping Profile P associated with Configuration P. When a new HVAC device is identified, and associated with Configuration P, the platforms and systems may query the data source mapping profile storage with configuration P. Specifically, a data source mapping profile selection component may select the Mapping Profile P for this new HVAC device. In some cases, the retrieved data from the newly-identified IoT device may be used to select the appropriate mapping profile. In some other cases, if the newly-identified data source (e.g., IoT device) has a configuration that does not match any existing mapping profile in the data source mapping profile storage (a first data storage), the platforms and system of present disclosure may generate a mapping profile specific to this data source configuration by performing the operations described above. Once a mapping profile is selected or generated for an identified data source, the mapping profile selection component may transmit the mapping profile to the mapping component for data mapping.

Once the data is extracted from an identified data source, and a selected data source mapping profile is selected/generated for the respective configuration for the identified data source, the mapping mechanism may map data from the source format to an ontology by application of a first algorithm. As described elsewhere herein, the mapping profile serves as a roadmap for mapping data. The first algorithm comprises a logic schema, a set of rules, a ML model, a statistical model, or a combination thereof. In some cases, the first algorithm executes instructions in a domain specific language (DSL) that provides mapping instructions.

In some other cases, the first algorithm executes instructions in a general purpose language that provides mapping instructions. For example, the mapping mechanism may receive the selected data source mapping profile for the identified data source based on the data source configuration. The selected data source mapping profile may provide descriptions for the data fields to map the extracted data. The first algorithm may then be applied to the extracted data based on the data field descriptions of the data source mapping profile. In this manner, the extracted data of data sources may be mapped to a normalized format based on the predetermined ontology. The predetermined ontology may describe all the equipment functions, properties, and data from the data source associated with the automation environment. Referring to the above example, the HVAC No. 1 manufactured by Vendor H may be used to generate a Mapping Profile P. The Mapping Profile P may include one or more of the following sets of rules: i) for a HVAC unit manufactured by Vendor H, with the model number D, there should be 25 data fields that may be mapped; ii) for a temperature sensor O embedded in the HVAC unit with the above configuration, it should be noted that the temperature sensor O has a data format in Celsius and Swiss date format, thus the temperature data of sensor O is for example, 27° C. at (dd.mm.yyyy); if the target data format (an ontology) has a data format of Celsius and National date format (i.e., YYYY-MM-DD), then the first algorithm may automatically convert the 27° C. to 80.6° F., and the (dd.mm.yyyy) to (YYYY-MM-DD); iii) if the ontology has a data field that the HVAC configuration does not provide, then leave that data field blank; for example, if this type of HVAC unit does not have a humidity sensor, then the first algorithm will automatically leave the data field for humidity sensor reading blank. While some examples of the mapping profile rules are provided, it will be appreciated that other forms of mapping profiles may be utilized to facilitate the mapping process. When a new IoT device is identified with a configuration that matches one of the existing data source mapping profile in the first storage, the mapping mechanism may utilize the mapping profile to automatically map the extracted data from the source format to the destination format, which conforms with the ontology. By utilizing the mapping profiles, the mapping component is able to understand the difference in data format from the source format to the destination format. The mapping component may process the above mapping mechanism by an Extensible Stylesheet Language Transformations (XSLT) file, or simple field mapping (A→7). In another example, Domain Specific Language (DSL) may be utilized to provide mapping instructions that are executable by the mapping component. Once some initial mappings between the source data to the ontology are performed, these mappings may be used as training examples that are fed to a machine learning algorithm. A machine learning algorithm may automatically build mapping profiles associated with each discovered IoT devices (i.e., potential data sources) without human intervention, and train itself overtime when new sets of data comes in. The machine learning algorithm may map the subsequence stream of data coming from temperature sensors O into the ontology automatically because it has been trained to understand the difference between the source data format and the corresponding fields for the data. The machine learning algorithm can be a sub-algorithm of the first algorithm, wherein the first algorithm may perform the initial mappings, and then using the initial mappings to train this subset machine learning algorithm to perform the subsequent mappings.

A data merging/storage component may merge the mapped data into one or more databases. A simple relational database could be used by the data merging/storage mechanism. In another example, a combination of relational database and a time-series database may be used by the data merging mechanism. A time-series database may reflect the data changes of the mapped data overtime. Generally, a relational database enjoys the benefit of robust secondary index support, complex predicates, a rich query language, etc. However, when the data changes rapidly overtime, the volume of data can scale up enormously. Thus, it is preferable to have a separate time-series database works alongside the relational database. In another preferred example, the data merging/storage component utilizes a graph database to store the mapped data. A graph database is a database that uses graph structure for semantic queries with nodes (please note that "node" and "vertex" are used interchangeably in this application), edges, and properties to represent and store data. The data storage component of the present application provides a data structure wherein each vertex (node) in the graph also has a time-series store to capture data change overtime. The time-series store may be a standalone database, or it can be defined as a property of the vertex (node). For example, the temperature data extracted from temperature sensor O at 8 pm on Jan. 27, 2021 may be stored in a graph database. The node in the graph may represent sensor O and the value is 27° C. The timestamp 8 pm on Jan. 27, 2021 is stored as property for this node in the graph of the graph database. The time-series store may be associated with the nodes, and it may reflect the data changes overtime and provide a user with actionable insight. The relationship between different nodes are stored by edges. For example, the relationship between the temperature sensor O and a lighting sensor R may be defined by the edge between them. The edge may provide important information to a user, for example, when the lights are on (as shown by the lighting sensor R) near the temperature sensor O, the temperature may increase because the light bulbs produce heat. As we know the heat produced by light bulbs is considered as waste. A user provided by the information represented by the edge between the lighting sensor R and temperature sensor O may analyze the energy waste produced by a certain brand/type of light bulbs and make the decision on whether it is cost-efficient to replace these light bulbs. As describe above, because the mapped data is merged/stored with time-series store in a database, the resulting data contains a living representation of the data rather than a static view of the data. In the subsequent operations, the evolved and evolving vertices (nodes) in the graph may provide both provenance and history associated with them, and thus enable the downstream components to work on the merged data. In some cases, one of the downstream component may be a data enrichment component. In some cases, the data enrichment component may enrich the merged data by discovery the relationships between IoT devices. The details of the operation of the data enrichment component are described in related applications.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method comprising:
 a) identifying a plurality of data sources associated with an automation environment, wherein each data source comprises a respective data source configuration;
 b) retrieving data from at least one of the identified data sources;
 c) generating a plurality of data source mapping profiles, each data source mapping profile specific to a particular data source configuration, wherein generating a data source mapping profile comprises:
  i) observing network communications for a particular data source, and applying a machine learning model to generate a plurality of preliminary data source mapping profiles;
  ii) determining whether human validation is needed to update one or more of the plurality of preliminary data source mapping profiles;
  iii) conducting human validation to the one or more of the plurality of preliminary data source mapping profiles to generate an output, and sending the output as a training example to the machine learning model; and
  iv) generating the plurality of data source mapping profiles by the machine learning model,
 d) maintaining a first data store comprising the plurality of data source mapping profiles;
 e) selecting a data source mapping profile, from the plurality of data source mapping profiles, that is specific to the respective data source configuration associated with each of the at least one identified data source; and
 f) applying a first algorithm to map the retrieved data to a predetermined ontology based on the selected data source mapping profile for the at least one identified data source.

2. The method of claim 1, wherein the automation environment comprises at least one networked industrial or commercial automation system.

3. The method of claim 1, wherein the plurality of data sources comprises at least one device, at least one programmable logic controller (PLC), at least one automation controller, at least one data file, at least one cloud service, or a combination thereof.

4. The method of claim 1, wherein the plurality of data sources comprises at least one device utilizing a first communications protocol and at least one device utilizing a second communications protocol, wherein the first communications protocol is different from the second communications protocol.

5. The method of claim 1, wherein the identifying the plurality of data sources is performed by passive discovery, active discovery, target interrogation, or a combination thereof.

6. The method of claim 5, wherein the passive discovery comprises observing traffic on a network and identifying an origin or a destination for the traffic on the network.

7. The method of claim 5, wherein the active discovery comprises IP subnet scanning on a network, port scanning on a network, issuing protocol specific discovery commands on a network, or a combination thereof.

8. The method of claim 5, wherein the target interrogation comprises introspecting at least one PLC on a network.

9. The method of claim 1, wherein the retrieving data is performed on a schedule, performed in response to an event, as a result of passively observing communications among the data sources, or a combination thereof.

10. The method of claim 1, wherein the retrieved data comprises a unique address for the data source.

11. The method of claim 1, wherein the retrieved data comprises one or more of: a make, model, and firmware version for the data source.

12. The method of claim 1, wherein the retrieved data comprises a unique fingerprint identifying the data source.

13. The method of claim 1, further comprising:
 identifying manufacturer documentation for the particular data source configuration;
 applying automated document processing (ADP), automated form recognition (AFR), manual analysis, or any combination thereof to process details of the documentation, and
 applying the machine learning model to the output of the ADP or AFR process to generate the data source mapping profile.

14. The method of claim 1, wherein the machine learning model comprises one or more of the following: one or more neural networks, one or more deep neural networks, one or more support vector machines (SVM), one or more Bayesian models, linear regression, logistic regression, or k-means clustering.

15. The method of claim 1, wherein a data source mapping profile specific to the particular data source configuration comprises:
 a) identifying manufacturer documentation for the particular data source configuration; and
 b) applying the machine learning model to process details of the documentation.

16. The method of claim 15, wherein the machine learning model comprises one or more of the following: one or more neural networks, one or more deep neural networks, one or more support vector machines (SVM), one or more Bayesian models, linear regression, logistic regression, or k-means clustering.

17. The method of claim 15, further comprising conducting human validation of the output of the machine learning model and utilizing the output of the human validation to improve the machine learning model.

18. The method of claim 1, wherein the predetermined ontology describes all of the equipment functions, properties, and data for the data sources associated with the automation environment.

19. The method of claim 1, wherein the data source mapping profile specific to the respective data source configuration associated with each of the at least one identified data source is selected based at least in part on the retrieved data.

20. The method of claim 1, wherein the first algorithm comprises, a logic schema, a set of rules, a machine learning model, a statistical model, or a combination thereof.

21. The method of claim 1, wherein the first algorithm executes instructions in a domain specific language (DSL) that provide mapping instructions.

22. The method of claim 1, wherein the first algorithm executes instructions in a general purpose language that provide mapping instructions.

23. The method of claim 1, further comprising:
 a) maintaining a second data store; and
 b) merging the mapped data into the second data store.

24. The method of claim 23, wherein the second data store comprises a graph database, wherein each vertex in the graph includes a timeseries store to capture data changes over time.

25. The method of claim 24, wherein the merging the mapped data into the second data store comprises matching mapped data with evolved vertices in the graph and merging new properties, shape details, or relationships into the matched vertices and timeseries data recorded in the vertex's timeseries store.

26. The method of claim 24, wherein the vertices, edges, properties, and underlying data is continuously updated to reflect the state of the data sources associated with the automation environment.

27. A system comprising at least one computing device comprising at least one processor, a memory, and instructions executable by the at least one processor to create an application comprising:
  a) a software module identifying a plurality of data sources associated with an automation environment, wherein each data source comprises a respective data source configuration;
  b) a software module retrieving data from at least one of the identified data sources;
  c) a software module generating a plurality of data source mapping profiles, each data source mapping profile specific to a particular data source configuration, wherein generating a data source mapping profile comprises:
    i) observing network communications for a particular data source, and applying a machine learning model to generate a plurality of preliminary data source mapping profiles;
    ii) determining whether human validation is needed to update one or more of the plurality of preliminary data source mapping profiles';
    iii) conducting human validation to the one or more of the plurality of preliminary data source mapping profiles to generate an output, and sending the output as a training example to the machine learning model; and
    iv generating the plurality of data source mapping profiles by the machine learning model,
  d) a first data store comprising the plurality of data source mapping profiles;
  e) a software module selecting a data source mapping profile, from the plurality of data source mapping profiles, that is specific to the respective data source configuration associated with each of the at least one identified data source; and
  f) a software module applying a first algorithm to map the retrieved data to a predetermined ontology based on the selected data source mapping profile for the at least one identified data source.

28. A computer-implemented method comprising:
  a) identifying a data source associated with an automation environment and having a data source configuration;
  b) retrieving data from identified data source;
  c) generating a data source mapping profile specific to the data source configuration by performing operations comprising: observing network communications for a particular data source, applying a machine learning model to generate a plurality of preliminary data source mapping profiles, determining whether human validation is needed to update one or more of the plurality of preliminary data source mapping profiles; conducting human validation to the one or more of the plurality of preliminary data source mapping profiles to generate an output, sending the output as a training example to the machine learning model, generating a plurality of data source mapping profiles by the machine learning model, selecting a data source mapping profile from the plurality of data source mapping profiles, wherein the selected data source mapping profile is specific o the data source configuration; and
  d) applying an algorithm to map the retrieved data to a predetermined ontology based on the data source mapping profile for the identified data source.

* * * * *